United States Patent
Nonami et al.

(10) Patent No.: US 7,510,141 B2
(45) Date of Patent: Mar. 31, 2009

(54) AUTONOMOUS CONTROL METHOD FOR SMALL UNMANNED HELICOPTER

(75) Inventors: Kenzo Nonami, 1-33-7, Tsukushino, Machida-shi, Tokyo (JP); Jin Ok Shin, 337-36, Seokyo-dong, Mapo-ku, Seoul (KR); Daigo Fujiwara, 1-21-7-107, Bingo Higashi, Kasukabe-shi, Saitama (JP); Kensaku Hazawa, 5-15-11, Ayukawa-cho, Hitachi-shi, Ibaraki (JP); Keitaro Matsusaka, Fuchu (JP)

(73) Assignees: Kenzo Nonami, Tokyo (JP); Jin Ok Shin, Seoul (KR); Daigo Fujiwara, Kusakabe-shi, Saitama-ken (JP); Kensaku Hazawa, Hitachi-shi, Ibaraki-ken (JP); Hirobo Limited, Fuchu-shi, Hiroshima-ken (JP)

( * ) Notice: Subject to any disclaimer, the term of this patent is extended or adjusted under 35 U.S.C. 154(b) by 387 days.

(21) Appl. No.: 11/194,466

(22) Filed: Aug. 2, 2005

(65) Prior Publication Data

US 2006/0060694 A1    Mar. 23, 2006

Related U.S. Application Data

(63) Continuation-in-part of application No. 10/786,051, filed on Feb. 26, 2004, now abandoned.

(30) Foreign Application Priority Data

Feb. 26, 2003  (JP)  ............... 2003-049570

(51) Int. Cl.
*B64C 13/16*   (2006.01)
(52) U.S. Cl. ............... 244/17.11; 244/76 R; 244/175; 244/177; 701/4; 701/11
(58) Field of Classification Search ............ 244/17.11, 244/76 R, 181, 177, 175; 701/4, 5, 6, 11
See application file for complete search history.

(56) References Cited

U.S. PATENT DOCUMENTS

2004/0075018 A1 *  4/2004  Yamane ............ 244/17.13

* cited by examiner

*Primary Examiner*—J. W Eldred
(74) *Attorney, Agent, or Firm*—Manabu Kanesaka

(57) ABSTRACT

An autonomous control method autonomously controls a small unmanned helicopter toward target values, such as a set position and velocity, by deriving model formulas well suited for the autonomous control of small unmanned helicopters, by designing an autonomous control algorithm based on the model formulas, and by calculating the autonomous control algorithm. The autonomous control system includes sensors that detect current position, attitude angle, altitude relative to the ground, and absolute azimuth of a nose of the small unmanned helicopter; a primary computational unit that calculates optimal control reference values for driving the helicopter from a target position or velocity values; a secondary computational unit that converts data collected by the sensors and the computational results as numeric values that are output by the primary computational unit into pulse signals; a ground station host computer used as the computational unit for the autonomous control system; and so on.

20 Claims, 18 Drawing Sheets

AUTONOMOUS CONTROL METHOD FOR SMALL UNMANNED HELICOPTER

BACKGROUND OF THE INVENTION

1. Field of the Invention

This invention relates to an autonomous control system for small unmanned helicopters, and autonomous control algorithms that control the rudders for said small unmanned helicopter based on the aforementioned mathematical models.

2. Description of the Prior Art

Helicopters are flying bodies that have operating ranges such as longitudinal motions, lateral motions, vertical motions, and hovering, which are not exhibited by an aircraft; as such, they have the advantage of being able to flexibly respond to various situations. Based on this advantage, there are hopes for constructing unmanned, small helicopters for use in places that are difficult or dangerous for manned operations, for example, in high-altitude work, such as the inspection of power transmission lines, or in emergency rescue operations or the detection of land mines. Previously, an autonomous control system using an unmanned helicopter for agricultural chemical spray applications was described in Patent Reference 1 listed below:

[Patent Reference 1]

Unexamined Japanese Patent Application Publication 2000-118498

First, let us provide a logical explanation of the mechanism of autonomous control for helicopters. Helicopters are the objects of control; they are flying bodies that are capable of changing their orientation by means of servo motor actions and are capable of three-dimensional motions. The purpose of flying by autonomous control is to move the helicopter according to positional and speed target values. The required maneuvering follows the computational results generated by calculation computer. In order to delegate the piloting of a helicopter to a computer, the calculation computer must have sensing and actuation functions. Devices that have the function of sensing the various flight conditions of a helicopter are called sensors. Actuators that move the helicopter's rudders by receiving autonomous control signals that are generated by determining control reference values based on computational results from the computer and by converting these results into signals are referred to as servo motors. The helicopter can be autonomously controlled toward a given target value by means of a feedback control loop that links "(sensor)-(calculation computer)-(servo motor)-(helicopter), Reference FIG. 1".

Following is a description of autonomous control for a small unmanned helicopter described in Patent Reference 1, with reference FIG. 2 to drawings. This system can be divided into a mobile station, which includes the helicopter and a ground station. Mounted on the ground station are a helicopter body 101; a sensor 102 that detects the current position and attitude angle of the helicopter body 101; servo motors 103 that move the rudders for the helicopter body 101; a backup receiver 104 that receives manual maneuver signals from a backup transmitter 110; and a wireless modem that communicates with the ground station. Employed in the sensor 1021 are the GPS (not shown in the figure) that detects the current position of the helicopter body 101 and tri-axis orientation sensors (not shown in the figure) that detect the tri-axial attitude angles of the helicopter body 101. Installed on the ground station are a computer CPU 108 for the input of reference values on which speed reference values are entered; a computer CPU 109 for internal computation purposes; and a backup transmitter 110 that permits the operator to perform manual operations in the event of the occurrence of a dangerous situation. The CPU 109 calculates position and attitude angle reference values from target speed values, compares the results with the current position, speed, and attitude angle obtained from the sensors 102, and based on these results, calculates control instruction values that bring the helicopter to the reference values. By forming a feedback control loop by linking "(sensors 102)-(CPU 109)-(servo motors 103)-(helicopter body 101)" (intervening components omitted), it is possible to effect the autonomous control of the helicopter toward its reference values.

Following is a description of the operation of the system. The operator sets four speed reference values (Vx*, Vy*, Vz*, ω*) consisting of longitudinal, lateral, vertical, and rotational speeds, on the CPU 108. The CPU 109 integrates these speed reference values with respect to time, obtaining a longitudinal target position X*, a lateral target position Y*, a vertical target position Z*, and a rotational target position (yawing angle) ψ*. Similarly, the CPU109 differentiates the four speed reference values (Vx*, Vy*, Vz*, ω*) and multiplies the results by coefficients to calculate a target pitching angle θ* and a target rolling angle φ*. The differences between the target values that are set in this manner and the detected values (θ, φ, ψ, ω) for the body attitude, speed (X, Y, Z, Vx, Vy, Vz) that are detected by the sensors 102 consisting of the GPS and tri-axis attitude sensors that are installed on the helicopter body 101 are calculated as follows:

$$\Delta X = X^* - X$$

$$\Delta Y = Y^* - Y$$

$$\Delta Z = Z^* - Z$$

$$\Delta Vx = Vx^* - Vx$$

$$\Delta Vy = Vy^* - Vy$$

$$\Delta Vz = Vz^* - Vz$$

$$\Delta \theta = \theta^* - \theta$$

$$\Delta \phi = \phi^* - \phi$$

$$\Delta \psi = \psi^* - \psi$$

$$\Delta \omega = \omega^* - \omega$$

Based upon these differences (errors), the CPU 109 calculates control reference values for the servo motors 103 that move the rudders for the helicopter body 101. Four types of control reference values are computed: elevator servo (longitudinal) instruction, aileron servo (lateral) instruction, corrective servo (vertical) instruction, and rudder servo (rotational) instruction. After computing these four types of control reference values, the CPU 109 supplies them to the aforementioned servo motors 103, and performs feedback control on these operations until the differences become zero (0).

Helicopters that are used in the aforementioned conventional autonomous control system were originally intended for the spraying of agricultural chemicals, with a maximum weight of approximately 30 kg. Although the aforementioned sensors and computational unit for the aforementioned conventional autonomous control system are large and heavy, the helicopter can adequately fly even when carrying these items. However, the unloaded helicopter used in the aforementioned conventional autonomous control system weights approximately 60 kg empty, and approximately 90 kg when fully loaded. Therefore, such a helicopter cannot easily be carried.

In addition, in order to use the system, the helicopter must have a flight range sufficiently larger than the actual helicopter, which limits the range over which the helicopter can be deployed. In some cases, manned helicopter operations involve a narrow space in which the aforementioned conventional helicopter cannot negotiate. On the other hand, the small unmanned helicopter addressed in the present invention refers to a helicopter comparable in size and weight to, and compatible with, a commercially available hobby-type small-scale radio-controlled helicopter. Although the above problem can be solved by effecting autonomous control in such a helicopter, the smaller the weight of a helicopter, the more difficult it is to control. In other words, the autonomous control system is subject to stringent constraints in terms of size and weight, and small helicopters tend to be unstable in terms of dynamic properties. Therefore, with the aforementioned conventional autonomous control system, it is impossible to mount the autonomous control system on the aforementioned small unmanned helicopter as is. Further, applying the autonomous control algorithms for the aforementioned conventional autonomous control system to the aforementioned small unmanned helicopter as is does not guarantee adequate control performance. Further, the calculation of a control instruction value is a time-consuming process due to a large number of computational steps involved in the determination of servo motor control instruction values; consequently, when one attempts to achieve size reductions in the autonomous control system, one must contend with the conflicting requirements of accommodating a large number of computational steps and the stringent constraints imposed on the capabilities of the computational equipment and the size of the control program. Further, beyond the computational equipment, the sensors are also subject to stringent constraints on size and weight, which clearly adds to the difficulty of construction of small and lightweight autonomous control systems. An autonomous control system that can be mounted and flown on the type of small unmanned helicopter for which the present invention is intended has not been successfully developed. Manual operation being independent from autonomous control, can be thought of as being completely unrelated to autonomous control. However, the process of designing an autonomous control algorithm may require the measurement of manual operation signals. In creating mathematical models in the present invention, we used a technique called system characterization, wherein a mathematical model is obtained by associating input signals into the aforementioned servo motors for the aforementioned small unmanned helicopter with output signals, which represent the flying conditions of the aforementioned small unmanned helicopter as measured by sensors installed on the aforementioned autonomous control system, and by analyzing the signals. The system characterization requires the collection of input/output data under the condition in which the aforementioned small unmanned helicopter is flying, and this process is referred to as a characterization experiment. Conducting a characterization experiment requires that the aforementioned servo motors be driven using characterization input signals that are appropriate for system characterization. In such a case, however, characterization input by itself can cause a substantial tilt in the attitude of the aforementioned small unmanned helicopter and sudden acceleration, with a potential risk of accidents. To prevent such a problem, it is necessary to stabilize the motion of the aforementioned small unmanned helicopter by controlling the correction rudder by means of manual operation. However, because the correction rudder is considered to be part of characterization input, for system characterization, the aforementioned manual operation signals must also be obtained as measurement data.

As stated above, the present invention also takes into consideration the use of the aforementioned autonomous control unit as an auxiliary unit for manual operation, i.e., as an operator assist unit. In terms of the objective and the technique of operation assistance, manual operation signals, for example, could be associated with the target value input signals for the aforementioned autonomous control algorithm, and the drive signals that are actually output to the aforementioned servo motors could all be treated as autonomous control signals that are computational results of the aforementioned autonomous control algorithm. In other words, the method may be described as follows: even though the human operator may have the illusion of operating the helicopter himself, in actuality, he merely provides motion commands, which are target values, to the aforementioned autonomous control small unmanned helicopter; upon receipt of the target values, the aforementioned autonomous control algorithm is calculated, and autonomous control is effected. The method can provide the aforementioned autonomous control algorithm with target values without using the aforementioned ground station computer, with the advantage that people not versed in computer operation can safely fly the aforementioned small unmanned helicopter, enjoying the benefits of the aforementioned autonomous control algorithm. This approach, however, requires a new technique for associating the aforementioned manual operation signals with target values.

The development of autonomous control algorithms for the autonomous control of the aforementioned small unmanned helicopter requires mathematical models that describe the dynamic characteristics of the helicopter. The use of mathematical models permits the application of various control theories, which have made strides in recent years and whose effectiveness has amply been recognized, to the development of autonomous control algorithms, which should improve the flight performance in situations in which the aforementioned small unmanned helicopter is controlled autonomously.

However, the dynamic characteristics of a helicopter are subject to a complex interplay of dynamical action and fluid dynamic action, which makes analysis an extremely difficult task. Although a detailed analysis of the dynamic characteristics of manned helicopters has been pursued aggressively, little detailed analysis has been performed with regard to helicopters of the size addressed in the present invention. In addition, there have been no reports on the dynamic characteristics of the aforementioned servo motors.

Even if a mathematical model that describes the dynamic characteristics of the aforementioned small unmanned helicopter in detail exists, if the mathematical model is a highly complex one, the development of an autonomous control algorithm will also be difficult. Autonomous control algorithms that are developed and based on complex mathematical models are generally complex, and may not necessarily be appropriate for execution by a computer that is subject to stringent restrictions on its computational capabilities due to weight limitations.

There is a system identification method that avoids theoretical analyses and draws inferences on the dynamic characteristics of a given physical system based on its input/output relationships. System identification requires the input of signals containing frequency components encompassing a broad bandwidth into the physical system. However, entering such signals into the aforementioned small unmanned helicopter involves a risk. In addition, such a system will also require devices for the measurement of the aforementioned input/ output signals and an instrumentation system. There have been no cases where system identification is run on the type of small unmanned helicopter addressed in the present invention and where the soundness of the identification model thus obtained is validated.

SUMMARY OF THE INVENTION

An objective of the present invention is to provide an autonomous control method that autonomously controls a small unmanned helicopter toward target values, such as a set position and velocity, by deriving model formulas that are well suited for the autonomous control of small unmanned helicopters, by designing an autonomous control algorithm based on the model formulas, and by calculating the autonomous control algorithm.

The autonomous control system for a small unmanned helicopter of the present invention comprises: sensors that detect the current position, the attitude angle, the altitude relative to the ground, and the absolute azimuth of the nose of the aforementioned small unmanned helicopter; a primary computational unit that calculates optimal control reference values for driving the servo motors that move five rudders on the helicopter from target position or velocity values that are set by the ground station and the aforementioned current position and attitude angle of the small unmanned helicopter that are detected by the aforementioned sensors; an autonomous control system equipped with a secondary computational unit that converts the data collected by said sensors and the computational results as numeric values that are output by said primary computational unit into pulse signals that can be accepted by the servo motors, such that these components are assembled into a small frame box, thereby achieving both size and weight reductions;

a ground station host computer that can also be used as the aforementioned computational unit for the aforementioned autonomous control system;

if the aforementioned ground station host computer is used as the aforementioned computational unit for the aforementioned autonomous control system, in the process of directing the computational results that are output from said ground station host computer to said servo motors through a manual operation transmitter, a radio control generator that converts said computational results as numerical values into pulse signals that said manual operation transmitter can accept;

a servo pulse mixing/switching apparatus, on all said servo motors for said small unmanned helicopter, that permits the switching of manual operation signals and said control signals that are output from said autonomous control system or mixing thereof in any ratio;

an autonomous control algorithm wherein the mathematical model for transfer function representation encompassing pitching operation input through pitch axis attitude angles in the tri-axis orientation control for said small unmanned helicopter is defined as $$G_\theta(s) = e^{-Ls} \frac{K_\theta \omega_{ns}^2}{(s^2 + 2\varsigma_s \omega_{ns} s + \omega_{ns}^2)(T_\theta s + 1)s}$$

wherein
$G_\theta$: parameter
$e^{-Ls}$: delay time element
$K_\theta$: model gain
$T_\theta$: model gain
$\omega_{ns}$: characteristic angular frequency
s: laplace operator
$\xi_s$: damped ratio such that the aforementioned small unmanned helicopter is controlled autonomously based on the aforementioned mathematical model;

an autonomous control algorithm wherein the mathematical model for transfer function representation encompassing rolling input through roll axis attitude angles for the aforementioned tri-axis orientation control is defined as $$G_\phi(s) = e^{-Ls} \frac{K_\phi \omega_{ns}^2}{(s^2 + 2\varsigma_s \omega_{ns} s + \omega_{ns}^2)(T_\phi s + 1)s}$$

wherein
$G_\phi$: parameter
$e^{-Ls}$: delay time element
$K_\phi$: model gain
$T_\phi$: model gain
$\omega_{ns}$: characteristic angular frequency
s: laplace operator
$\xi_s$: damped ratio such that the aforementioned small unmanned helicopter is controlled autonomously based on the aforementioned mathematical model;

an autonomous control algorithm wherein the mathematical model for transfer function representation encompassing yawing input through yaw axis attitude angles for the aforementioned tri-axis orientation control is defined as $$G_\psi(s) = e^{-Ls} \frac{K_\psi \omega_{ns}^2}{(s^2 + 2\varsigma_s \omega_{ns} s + \omega_{ns}^2)s}$$

wherein
$G_\psi$: parameter
$e^{-Ls}$: delay time element
$K_\psi$: model gain
$\omega_{ns}$: characteristic angular frequency
s: laplace operator
$\xi_s$: damped ratio such that the aforementioned small unmanned helicopter is controlled autonomously based on the aforementioned mathematical model;

an autonomous control algorithm wherein the mathematical model for transfer function representation encompassing pitch axis attitude angles through longitudinal speeds in the translational motion control for the aforementioned small unmanned helicopter is defined as $$Vx = g\frac{T}{s+T}\frac{a}{s-a}(-\Theta)$$

wherein
Vx: longitudinal speed
g: gravity acceleration
T: thrust
s: laplace operator
a: two dimensional dynamic lift inclination
$\Theta$: pitching axis attitude angle such that the aforementioned small unmanned helicopter is controlled autonomously based on the aforementioned mathematical model;

an autonomous control algorithm wherein the mathematical model for transfer function representation encompassing roll axis attitude angles through lateral speeds in the translational motion control for the aforementioned small unmanned helicopter is defined as $$Vy = g\frac{T}{s+T}\frac{a}{s-a}\Phi$$

wherein
Vy: lateral speed
g: gravity acceleration
T: thrust
s: laplace operator
a: two dimensional dynamic lift inclination
Φ: rolling axis attitude angle such that the aforementioned small unmanned helicopter is controlled autonomously based on the aforementioned mathematical model;

an autonomous control algorithm wherein the mathematical model for the transfer function representation of vertical speeds in the translational motion control for the aforementioned small unmanned helicopter is defined as $$Vz = \frac{k}{s}\Theta_t$$

wherein
Vz: vertical speed
k: constant
s: laplace operator
$\Theta_t$: corrective pitch angle such that the aforementioned small unmanned helicopter is controlled autonomously based on the aforementioned mathematical model;

The autonomous control method of the present invention permits the autonomous control of small unmanned helicopters according to position and velocity target values that are set by the human operator. In addition to implementing an autonomous control unit by mounting the autonomous control device used in this method on the body of a helicopter, we have developed a servo pulse mixing/switching unit that either mixes or switches autonomous control signals and manual operation signals, a pulse generator unit that converts these signals into pulse signals that the manual operation signal transmitter can accept, and an autonomous control algorithm that is well suited for the autonomous control of small unmanned helicopters; as a result, small unmanned helicopters, in the same class as hobby-oriented small radio-controlled helicopters, can be autonomously controlled according to target values. This permits complete autonomous control with hobby-oriented small radio-controlled helicopters; consequently, such helicopters become easily portable and can be adapted to small spaces in which it is impossible to perform operations using the conventional unmanned helicopter, and in which it is difficult to perform manned operations, and in this manner, the application of such helicopters can be broadened.

BRIEF DESCRIPTION OF THE DRAWING

The features and advantages of the present invention will be apparent from the following description of an exemplary embodiment of the invention and the accompanying drawing, in which.

DESCRIPTION OF THE PREFERRED EMBODIMENTS

The inventor of the present invention has consistently pursued autonomous control research from the design of the requisite hardware through the development of autonomous control algorithms. The inventor developed the aforementioned autonomous control system, the aforementioned radio-controlled pulse generator, the hardware for the aforementioned servo pulse mixing/switching unit, and the software on a novel and independent basis. In addition, the inventor conducted flight experiments for the characterization of the aforementioned mathematical models, derived mathematical models from the experimental results, and developed autonomous control algorithms for the small unmanned helicopter using the mathematical models. By using the autonomous control system, the inventor successfully achieved the complete autonomous control of a small helicopter body, with an unloaded weight of approximately 9 kg, according to target values.

In what follows, we provide a logical explanation of the hardware for the autonomous control of the small unmanned helicopter, and then describe research accomplishments on the tri-axial attitude control of the helicopter body and autonomous control algorithms for cruise speed/position control.

The helicopter body used in this invention is a helicopter with a size and weight comparable to those of small radio-controlled helicopters that are commercially available for hobby purposes. Its empty weight is approximately 9 kg. Using this small unmanned helicopter, the present invention can be applied to operations that are performed at a high altitude, such as the inspection of power transmission lines, to emergency rescue operations, to the detection of land mines, or to operations performed in narrow spaces that are too difficult or dangerous for human operators to perform. The small unmanned helicopter, which is the object of control, is a flying object whose orientation can be changed by the operation of five servo motors and which can be moved three-dimensionally.

The purpose of flight based on autonomous control, as in the aforementioned prior technologies, is to move the helicopter according to position and speed target values, and the maneuvering of the helicopter obeys the autonomous control algorithms based on mathematical models that have been developed by the inventor. The aforementioned autonomous control algorithms are installed on the calculation computer for the autonomous control system developed by the inventor, wherein the results of computations generated by the aforementioned calculation computer provide control signals for the respective servo motors.

Figure 1:
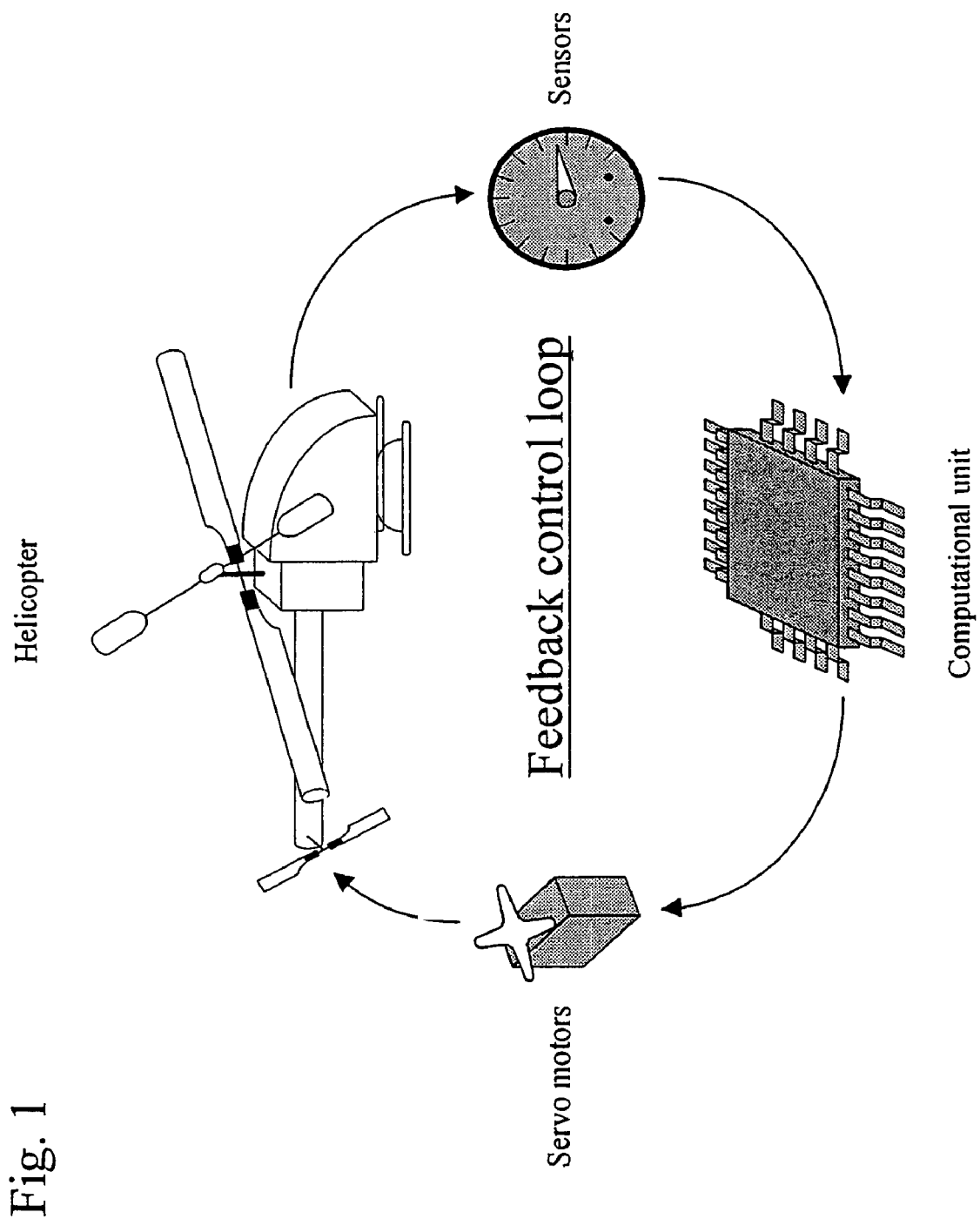
FIG. 1 is a feedback control loop system.
Figure 2:
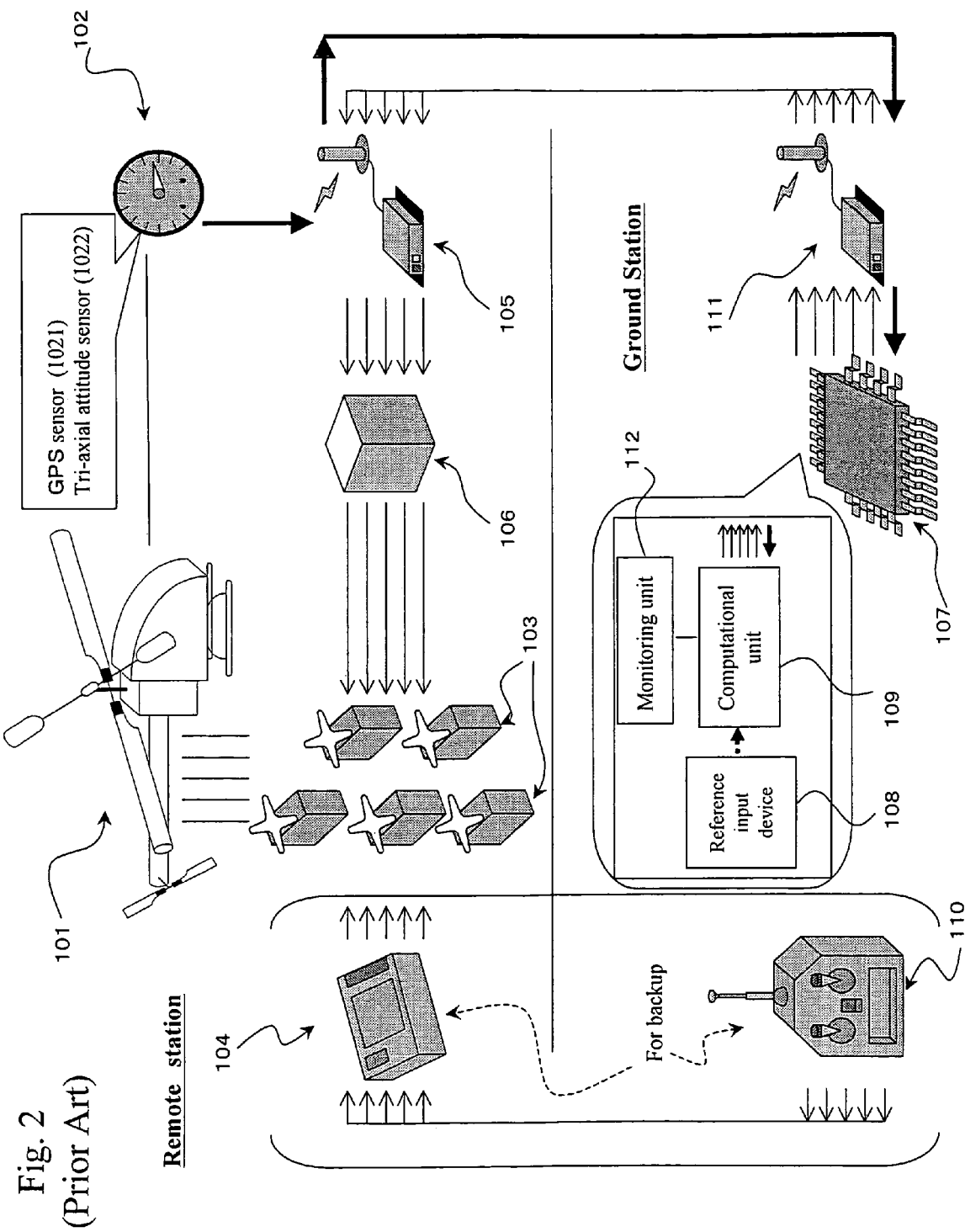
FIG. 2 is a configuration of autonomous control system using conventional unmanned helicopter system.

In order to delegate the piloting of a helicopter to a computer, the calculation computer must be endowed with sensing and actuation functions. Devices that have the function of sensing the various flight conditions of a helicopter are called sensors. Actuators that move the helicopter's rudders by receiving autonomous control signals that are generated by determining control reference values based on computational results from the computer and by converting them into signals are referred to as servo motors. By building an autonomous control system comprised of these components and mounting it on the helicopter body, it is possible to form a feedback control loop that links "(sensor)-(calculation computer)-(servo motor)-(helicopter)", as shown in FIG. 1.

The inventor of the present invention has developed an autonomous control system, which is a piece of hardware, as a platform that permits the autonomous control of the aforementioned small unmanned helicopter. Because the aforementioned servo motors among the pieces of hardware that make up the autonomous control system are incorporated into the body of the aforementioned small unmanned helicopter, the aforementioned autonomous control system contains built-in sensors and computational units. Sensors that are incorporated into a conventional autonomous control system include tri-axis attitude sensors that detect the orientation of the helicopter and the Global Positioning System (GPS) that detects the current position of the helicopter. In addition, the autonomous control system of the present invention incorporates a ground altitude sensor that detects the distance between the body of the aforementioned small unmanned helicopter and the ground surface, and this permits the use of an autonomous control algorithm that utilizes the altitude with respect to the ground as sensor information. The autonomous control system also incorporates the primary computational unit, which is a computation CPU used for the implementation and calculation of autonomous control algorithms, as well as a secondary computational unit, which is a CPU that collects and processes data from the aforementioned sensors, and converts the aforementioned computational results into control signals. Efforts to reduce the size and weight of the autonomous control system create a problem of stringent restrictions on the functionality and processing speeds of the computational unit. We solved this problem by diving the computational unit into two technologies, the primary computational unit and a secondary computational unit, wherein the secondary computational unit is assigned the role of all computations with the exception of autonomous control algorithms, and the primary computational unit is allowed to concentrate on the computation of autonomous control algorithms. In addition, the autonomous control system incorporates a power supply unit that outputs power with a voltage required by the aforementioned sensors and the aforementioned computational units, as well as a wireless modem that communicates with the ground station. The aforementioned power supply unit takes a DC power supply of a positive voltage as input and can supply power at three voltages, including a negative voltage. The aforementioned wireless modem comprises two sets, wherein one set is used for the exchange of control information with the ground station host computer, and the other set for the exchange of supplementary information that improves the accuracy of GPS current position information. The autonomous control system of the present invention, which is designed under the assumption that it would be installed on the aforementioned small unmanned helicopter, must necessarily be small and lightweight. The aforementioned small unmanned helicopter of the present invention has an approximate maximum payload of only 5 kg. Therefore, in constructing the autonomous control system, the inventor of the present invention excluded any extraneous components that would lead to an increase in weight or size. Based upon this consideration, the inventor assembled the aforementioned sensors, the aforementioned computational units, the aforementioned power supply unit, and the aforementioned wireless modem into a small frame box of W 190 mm×D 290 mm×H 110 mm, and thus succeeded in the development of an autonomous control system with an approximate weight of 2.9 kg. For batteries, we adopted a commercially available high-capacity lithium ion battery, approximately 700 g in weight, for notebook personal computers, which assured a continuous operating time of approximately 1 hour when fully charged. Including stays and other accessories for installing the unit of the aforementioned small unmanned helicopter, a weight reduction extensive enough to fall within the aforementioned maximum payload was accomplished for this autonomous control system.

Although the aforementioned autonomous control system of the present invention has an adequate autonomous control algorithm computational capacity, to provide for the future possibility of loading more complex autonomous control algorithms that cannot be handled by the aforementioned primary computational unit, the inventor of the present invention made provisions for the use of a ground station host computer for the computation of autonomous control algorithms so that a computer significantly more powerful than the aforementioned primary computational unit can be employed. This arrangement permits various operating modes, such as a mode in which, for example, attitude control is loaded on the aforementioned primary computational unit of the aforementioned autonomous control system and everything else is loaded on the aforementioned ground station host computer, and a mode in which only the autonomous control algorithm related to some of the servo motors is loaded on the aforementioned primary computational unit of the aforementioned autonomous control system and autonomous control algorithms for any other servo motors are loaded on the aforementioned ground station host computer, in addition to the operating mode in which all autonomous control algorithms are loaded on the aforementioned ground station host computer, thereby substantially improving the expansion potential of the aforementioned autonomous control system.

The manual operation transmitter for hobby purposes is provided with a function of receiving external operation signals that permits beginning operators to practice piloting. When a ground station computer is used for the computation of autonomous control algorithms, it is possible to drive the aforementioned servo motors for the aforementioned small unmanned helicopter by providing autonomous control computation results as external operation signals to the aforementioned manual operation transmitter. Further, by using the aforementioned servo pulse mixing/switching unit, it is possible to drive the aforementioned servo motors by first transmitting the aforementioned external operation signals to the aforementioned autonomous control system to generate another computational processing, instead of driving the aforementioned servo motors directly by means of the aforementioned external operation signals.

The aforementioned manual operation transmitter can only accept the aforementioned external operation signals that are encoded in pulse format. Therefore, the aforementioned autonomous control computational results need to be converted into the pulse format. However, no conversion equipment that can be directly connected to the aforementioned ground station computer has been developed.

Figure 18:
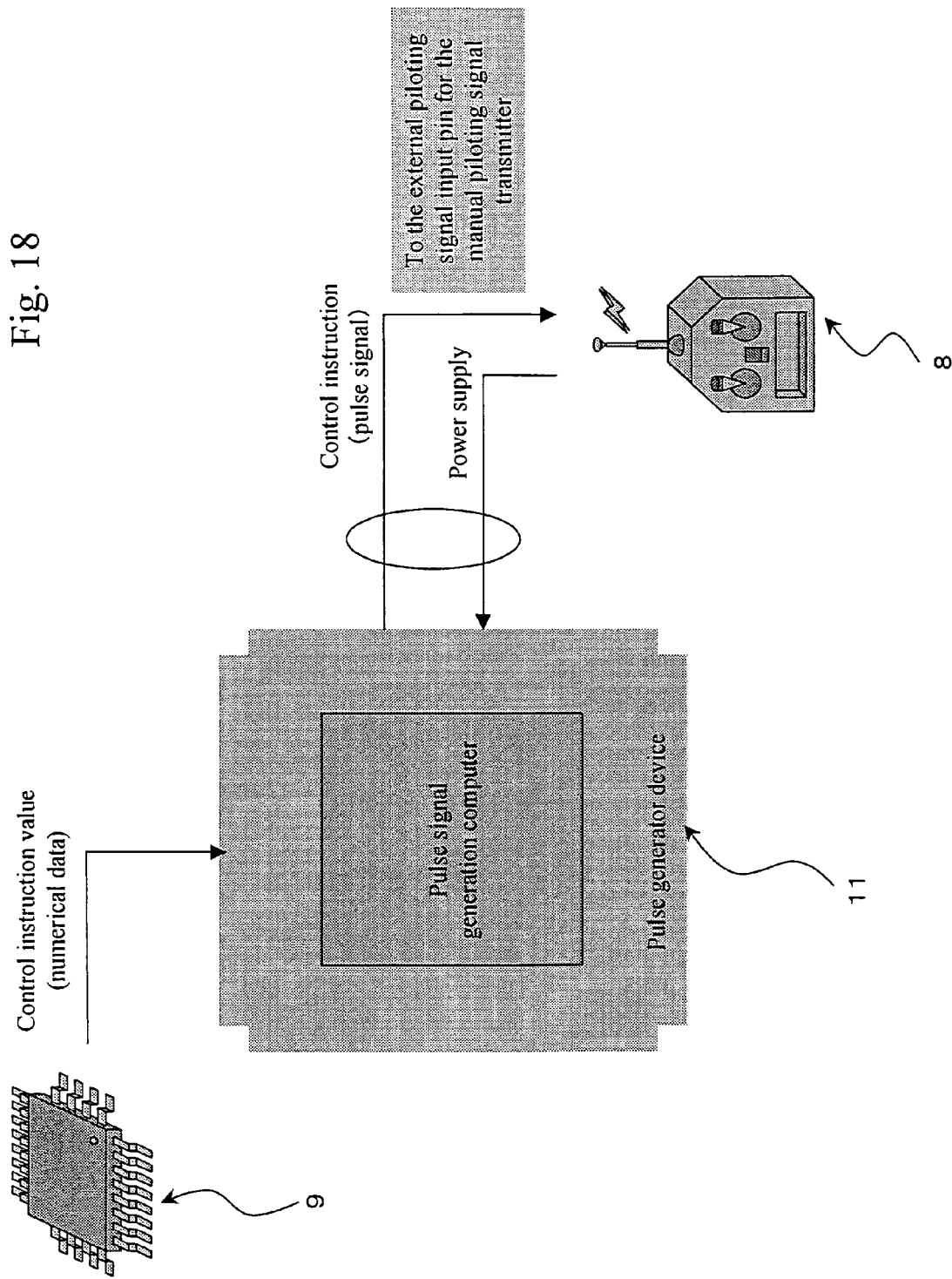
FIG. 18 is a Configuration of convert system to the control signal from control referenece signal using pulse generator device.

In view of this fact, the inventor of the present invention developed a radio control pulse generator unit that converts computational results, in the form of numerical values that are output from the aforementioned ground station host computer, into the aforementioned pulse signal format that can be accepted by the aforementioned manual operation signal transmitter(refer to FIG. 18). This unit uses the RS-232C type serial communication method on the input side, which is a common data communication technique, and thus can be used on almost any existing computer. For the power supply, the unit uses the power that is supplied by the aforementioned manual operation transmitter, which eliminates the need for providing a special power supply for the operation of the unit, thus facilitating the handling of the unit. In addition, the unit is endowed with functions that feed the number of maneuvering operations and switching states of the aforementioned manual operation transmitter to the aforementioned computer.

For the present invention, we developed a servo pulse mixing/switching unit that permits a switch over to manual operation in the event of an emergency situation during autonomous control so that the aforementioned small unmanned helicopter can fly safely. The following is a description of how the aforementioned servo pulse mixing/switching unit works, with reference to FIG. 16. The servo pulse mixing/switching unit 7, by means of a pulse-processing computation CPU 71 that is built in the unit, processes the pulse signals that are transmitted from the manual operation receiver 6 and the secondary computational unit 42 of the autonomous control unit, and generates servo pulse signals to be output to the servo motors 3. The pulse signals that are input from the manual operation signal receiver 6 into the servo pulse mixing/switching unit 7 are composed of manual operation signals, switching instruction signals between the manual operation and autonomous control modes, and mixing ratio instruction signals between manual operation and autonomous control signals. On the other hand, the pulse signals that are input from the secondary computing unit 42 of the autonomous control system into the servo pulse mixing/switching unit 7 are autonomous control signals. The servo pulse mixing/switching unit 7 recognizes the switching instruction signals and the mixing ratio instruction signals. Based on these signals, the servo pulse mixing/switching unit mixes manual operation signals and the autonomous control signals that are generated in the secondary computing unit 42 in an arbitrary ratio, generates servo pulse signals based on the ratio, and can output the results to the aforementioned servo motors 3. Construction of the servo pulse mixing/switching unit 3 in this manner has made it possible to switch between manual operation signals and autonomous control signals dynamically at any time during the flight. In view of the essential requirements for size and weight reductions for this unit, as in the case of the aforementioned autonomous control system, we achieved a weight reduction to a final weight of only 250 g.

In the present invention, the aforementioned servo pulse mixing/switching unit 7 is provided with the function of mixing manual operation signals and autonomous control signals in an arbitrary ratio. This will be described with reference to FIG. 16. To mix manual operation signals and autonomous control signals, a mixing signal instruction signal that provides a mixing ratio is also input into the unit. As may be understood from the figure, the mixing ratio instruction signal can also be supplied by the manual operation signal transmitter. The pulse-processing computational CPU 71 recognizes the mixing ratio instruction signal, determines the mixing ratio, and based on this ratio, performs calculations for mixing manual operation signals and autonomous control signals, generates the aforementioned serve pulse signals, and can drive each of the servo motors 3. In this manner, the present invention permits the use of the aforementioned autonomous control system as a manual operation assist unit, endowed with a function for the step-wise development of manual operation skills. Because the mixing can be accomplished in any ratio, when the operator is not versed in the operation of the radio-controlled helicopter, the relative weight of autonomous control signals and manual operation signals can be adjusted in favor of autonomous control so that autonomous control signals can take recovery action if the operator performs unskilled maneuvering to prevent the helicopter from crashing, and as the operator becomes used to the operation of the radio-controlled helicopter, the relative weight can be adjusted in favor of manual operation. In this manner, the invention permits gradual improvements in the manual operation of the radio-controlled helicopter.

Figure 16:
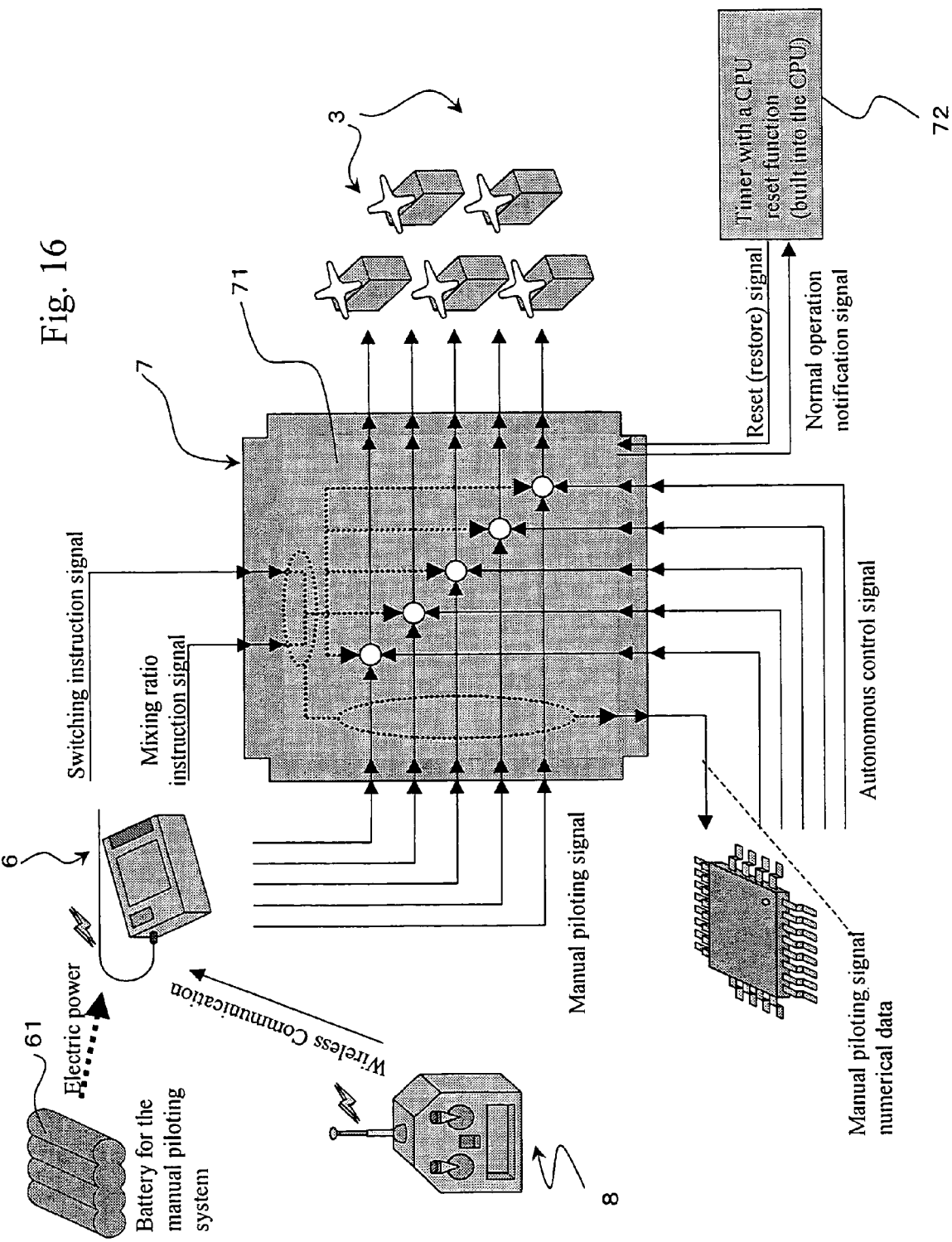
FIG. 16 is an internal structure of servo pulse mixing/switching device.

The present invention is designed so that the aforementioned servo pulse mixing/switching unit is permitted to draw its power on a shared basis from the power supply for the manual operation system. In FIG. 16, the power supply for the manual operation system is the battery 61. The power is supplied to the aforementioned servo pulse mixing/switching unit 7 through the signal lines for the manual operation signal, the switching instruction, or the mixing ratio instruction that is input from the manual operation signal transmitter 8 into the aforementioned servo pulse mixing/switching unit 7. In addition, the power is supplied to the aforementioned servo motors 3 through the inside of the body of the aforementioned servo pulse mixing/switching unit 7. This eliminates the need for excessively increasing the number of batteries, prevents the problem of missing a dead battery by oversight, forgetting to turn the power switch on, or miss-connecting the wires due to increased complexity of wiring and other types of human error, and thus enhances the safety of the autonomous control system for the aforementioned small unmanned helicopter at the practical level. With regard to the sharing of the power supply, there is a basis for sharing the power supply for the aforementioned manual operation system rather than the aforementioned autonomous control unit. The reason is that if the power supply for the aforementioned manual operation system runs down, the aforementioned servo motors 3 will also cease to operate, with the result that even when the power is being supplied to the autonomous control unit, the aforementioned small unmanned helicopter will become inoperable. Also, to maintain compatibility between the small unmanned helicopter and the hobby-oriented radio-controlled helicopter, it is necessary to keep manual operation enabled even when the power for the autonomous control unit is cut off.

In addition, in order to maintain the reliability of the manual operation system also through the introduction of the aforementioned servo pulse mixing/switching unit into the manual operation system, the present invention incorporates into the aforementioned servo pulse mixing/switching unit 7 a mechanism that automatically detects any malfunction of the pulse-processing computational CPU 71, which is the key to the aforementioned servo pulse mixing/switching unit that automatically restores the CPU, and immediately returns it to the original operating condition. Built into the aforementioned pulse-processing computational CPU 71 is a timer unit 72 with the function of resetting the aforementioned pulse-processing computational CPU 71, and this timer is used actively. The pulse-processing computational program, which is written into the aforementioned servo pulse mixing/switching unit 7 inputs at fixed time intervals a normal operation notification signal indicating the state of normal operation into the aforementioned timer unit 72. Malfunctioning of the aforementioned pulse-processing computational CPU 71 disables the input of the aforementioned normal operation notification signal into the aforementioned timer unit 72. If a certain length of time elapses in this condition, the aforementioned timer unit 72 automatically inputs a reset signal to the aforementioned pulse-processing computational CPU 71, and effects a recovery through a process similar to the power-on process. The reliable operation of this function required the development of the processing structure for the aforementioned pulse-processing computational program under the assumption that the function will be used. Specifically, we developed a program having a structure wherein the processing component that transmits normal operation notification signals to the aforementioned timer unit is completely separated from the pulse input/output data unit which has a high priority level and which has the potential of being called even in the midst of a malfunction of the pulse-processing computational CPU 71. This permits the reliable detection of abnormal operating conditions of the pulse-processing computational CPU 71. It should be noted that the length of time between the occurrence of a malfunction to the issuance of a reset signal can be specified in the aforementioned pulse-processing computational program. All operations from the time a reset signal is input to the time the system is recovered are performed automatically and instantaneously. In this manner, the aforementioned pulse-processing computational CPU 71 can be restored in a matter of dozens or hundreds of milliseconds from the time a malfunction occurred. The assurance of continuously normal operations in terms of software ensures the safety and reliability of the aforementioned servo pulse mixing/switching unit.

In this invention, we developed for the aforementioned servo pulse mixing/switching unit a function that automatically recognizes the line connection status of the manual operation signals, switching instruction signals, mixing ratio instruction signals, and autonomous control signals for the signal lines that are connected to the aforementioned servo pulse mixing/switching unit 7, and the presence or absence of pulse signals that are input into the aforementioned servo pulse mixing/switching unit through these signal lines, as well as a function that generates appropriate servo pulse signals according to the conditions that are detected. The pulse-processing computational CPU 71 continuously measures the manual operation signals, switching instruction signals, mixing ratio instruction signals, and autonomous control signals of the pulse signals that are input. If measured values on these pulse signals indicate an abnormal value, the pulse-processing computational software determines whether the signal line associated with the pulse signal is loose or the pulse signal has become extinct. Specifically, if switching instruction signals cease, all servo motors are forced to turn to the manual operation mode; if autonomous control signals cease, the affected servo motor 3 is forced to turn to the manual operation mode; if mixing ratio instruction signals cease, no arbitrary-ratio mixing is performed and the servo pulse mixing/switching unit operates solely in the switching function; and if manual operation signals cease, the affected serve motor is forced to turn to the autonomous control mode. Moreover, if all signals cease to be supplied, the software is programmed so that the servo motors will maintain the last operating status that was in effect. In this manner, even when the aforementioned autonomous control system is in a power-off condition, i.e., in a condition where no autonomous control signals are being supplied, the helicopter can be operated manually, similar to a hobby helicopter, provided that the power is supplied to the manual operation system. In addition, in the event of failure to supply autonomous control signals due to a dead power supply battery for the aforementioned autonomous control system in the midst of autonomous control by the aforementioned autonomous control system, the extinction of the autonomous control signals is instantaneously recognized and the system is switched over to manual operation. In this manner, helicopter crashing accidents can be prevented by means of manual operation by the operator. In other words, the manual operation system does not depend on the presence or absence of the autonomous control system, and the autonomous control system does not affect the manual operation system at all. Thus, the use of this functionality has permitted the implementation of the separation of the two signal systems in a safe manner.

In this invention, the aforementioned servo pulse mixing/switching unit is provided with a function that converts pulse measurement data on the manual operation, switching instructions, and mixing ratio instruction signals of the signals that are input from the manual operation signal receiver 6 to the aforementioned servo pulse mixing/switching unit into numerical data and outputs the results to the aforementioned autonomous control unit (in the figure, numerical data of manual operation signals (rudders). The pulse-processing computational CPU71 of the aforementioned servo pulse mixing/switching unit 7 constantly measures manual operation, switching instructions, and mixing ratio instruction signals. The servo pulse mixing/switching unit is provided with a mechanism that outputs these measured data as numerical data to the aforementioned autonomous control unit through RS-232C serial communications, which are a general-purpose interface. The data that can be output in the form of numerical data is by no means limited to the types of data mentioned above; any input signals and output signals to and from the aforementioned servo pulse mixing/switching unit 7 can be output. The aforementioned autonomous control unit treats this data in a manner similar to handling data from other sensors. This function permits the recording and storage of the aforementioned manual operation signals similar to other sensor data, thereby allowing the implementation of safe, system characterization experiments using correction rudders for manual operation, and system characterization based in the input/output data that is obtained from system characterization experiments.

Figure 17:
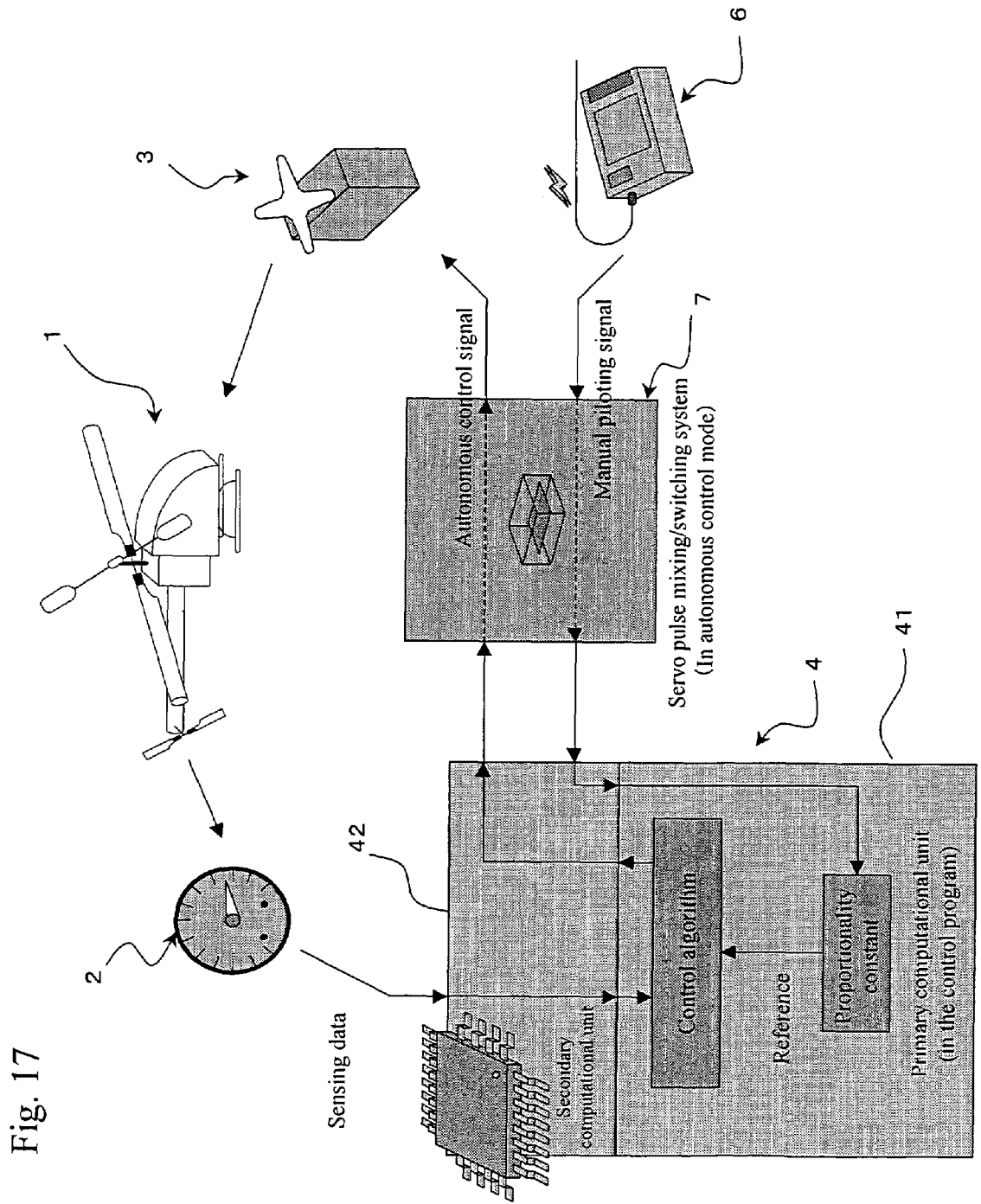
FIG. 17 is a configuration of control system using manual piloting signal transmitter as reference input device.

In addition, in this present invention, we devised a function capable of providing target values from the manual operation signal transmitter 8 to the aforementioned autonomous control algorithm implemented in the aforementioned primary computer of the aforementioned autonomous control unit, and this function was implemented in the aforementioned primary computer. This is described with reference to FIG. 17. Using the function, incorporated in the aforementioned servo pulse mixing/switching unit 7, that outputs manual operation signals as numerical measurement data to the aforementioned autonomous control unit, target values are generated by multiplying the manual operation signals by a constant of proportionality, and in this manner, the autonomous control of the aforementioned small unmanned helicopter was achieved. It should be noted that the aforementioned constant of proportionality need not be a fixed number; it can be any quantity that associates manual operation signals with target values. In this manner, it is possible to use the manual operation signal transmitter 8 as a target value signal input unit for the autonomous control algorithm. Using the manual operation signal transmitter 8, the operator can intuitively provide target values, such as the direction of motion and velocity, to the aforementioned small unmanned helicopter, and can accomplish given objectives by safely maneuvering the helicopter as if manually operated. In this method, even though the operator may be under the illusion of performing manual operations, autonomous control signals that are provided to the aforementioned servo motors 3 are actually computed by the autonomous control algorithm. The operation of the <autonomous control algorithm>→<autonomous control signal>→<servo pulse mixing/switching unit 7>→<servo motor>→<small unmanned helicopter 1>→<sensor data>→<autonomous control algorithm> feedback loop ensures the safety of the aforementioned small unmanned helicopter at all times, and in this manner, extremely safe flying can be realized.

Following is a description of the results of research on tri-axial attitude control for the body of the helicopter and autonomous control algorithms for cruising speed/position control.

(Tri-Axial Attitude Control)

First, we explain tri-axial attitude control using the control system for the small unmanned helicopter.

Figure 4:
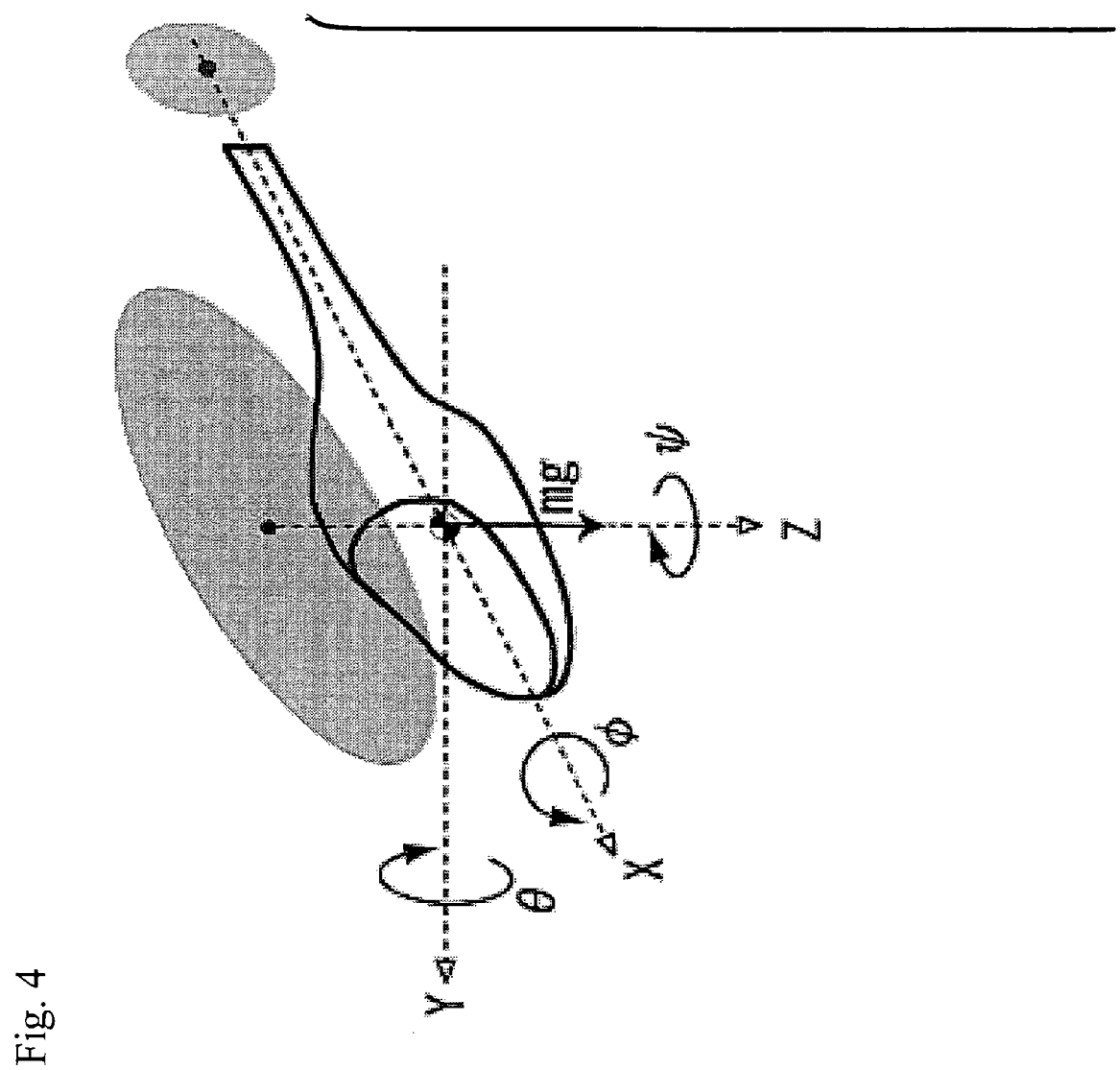
FIG. 4 is a coordinate system of small, unmanned helicopter of the invention.

We define a coordinates system as in FIG. 4. The attitude angles θ, φ, and ψ represent the pitching angle, the rolling angle, and the yawing angle, respectively. In this coordinates system, the positive X direction is the forward direction from the body, the positive Y direction is the direction to the right of the body, and the positive Z direction is the direction downward from the body.

(Modeling of Servo Motors)

Servo motors similar to those used in a small hobby-type radio-controlled helicopter are used as actuators for the body of the helicopter, wherein the input pulse width is equal to the rotational angle of a servo motor (natural frequency or characteristic angular frequency). Parameters $\xi_s$ and $\omega_{ns}$ were determined by the partial space identification method by assuming the characteristics of a servo motor as in Eq. (1) using a transfer function and by entering M-series of signals as pulse widths into the servo motors.

$$G_s(s) = \frac{\omega_{ns}^2}{s^2 + 2\xi_s \omega_{ns} s + \omega_{ns}^2} \quad (1)$$

wherein
$G_s$: parameter
$\omega_{ns}$: characteristic angular frequency
s: laplace operator
$\xi_s$: damped ratio (Pitching Rolling Model)

The autonomous control system used in the present invention includes sensor delay time and delay time in the wireless space. Such delay time represents three times the sampling time. Therefore, the transfer function representation from an elevator servo (longitudinal direction instruction to the pitch axis-attitude angle θ, as in Eq. (2), takes the form of the following transfer function equation (3) from an aileron servo (lateral direction) instruction to the roll axis attitude angle φ:

$$G_\theta(s) = e^{-Ls} \frac{K_\theta \omega_{ns}^2}{(s^2 + 2\xi_s \omega_{ns} s + \omega_{ns}^2)(T_\theta s + 1)s} \quad (2)$$

$$G_\phi(s) = e^{-Ls} \frac{K_\phi \omega_{ns}^2}{(s^2 + 2\xi_s \omega_{ns} s + \omega_{ns}^2)(T_\phi s + 1)s} \quad (3)$$

wherein
$G_\theta$: parameter
$e^{-Ls}$: delay time element
$K_\theta$: model gain
$T_\theta$: model gain
$\omega_{ns}$: characteristic angular frequency
s: laplace operator
$\xi_s$: damped ratio
$G_\phi$: parameter
$K_\phi$: model gain
$T_\phi$: model gain (Yawing Model)

The system incorporates a yaw axis speed stabilization rate gyro unit similar to that used in a small hobby-type radio-controlled helicopter. The unit performs controls by treating the input data as a yaw axis rotational angle speed. The helicopter body used in the present mode of embodiment also incorporates an angular velocity servo controller that uses an angular velocity gyro sensor. This sensor is assumed to be a second-order delay system.

Figure 5:
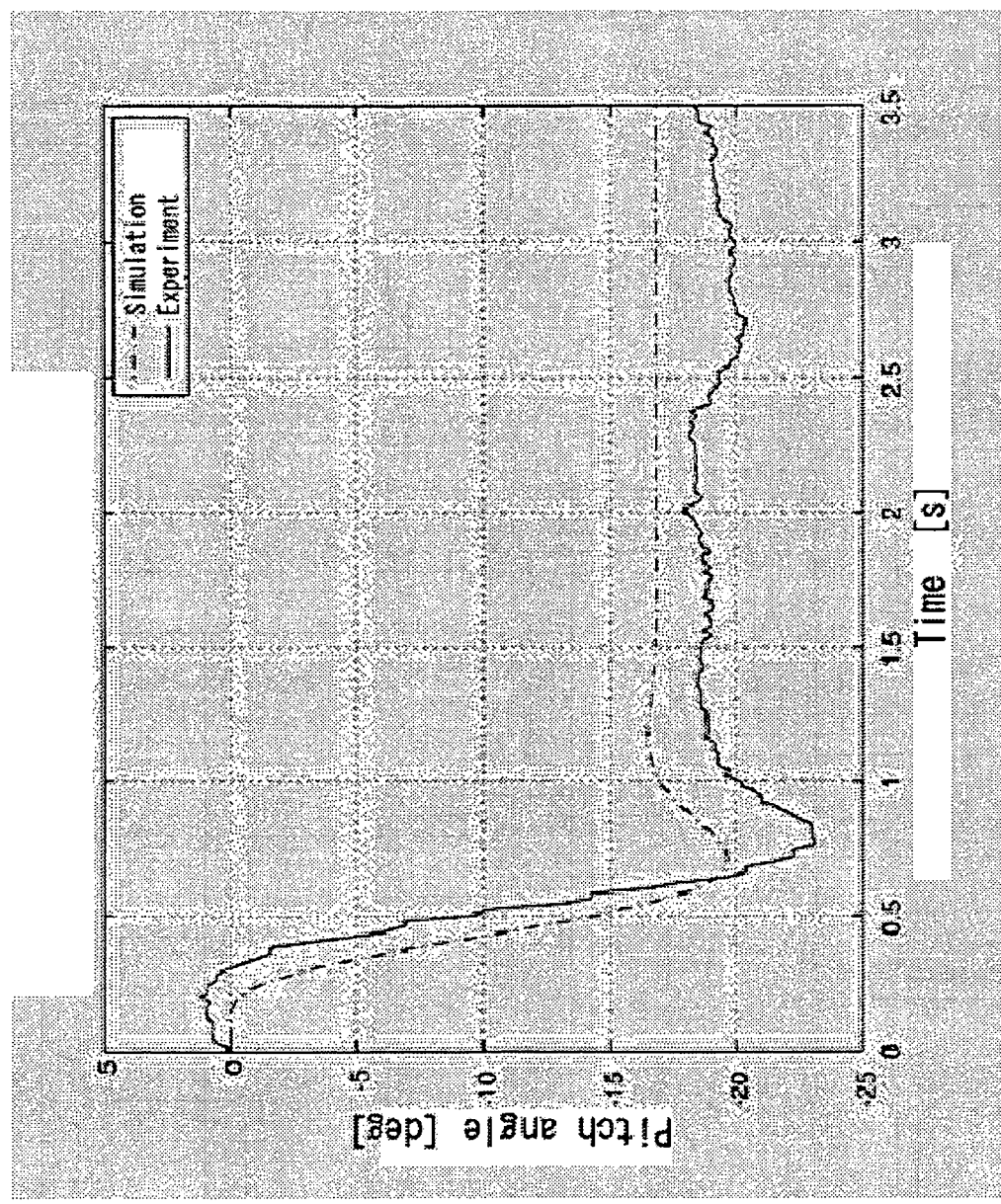
FIG. 5 is a simulated and experimental results of pitch axis of the invention.
Figure 6:
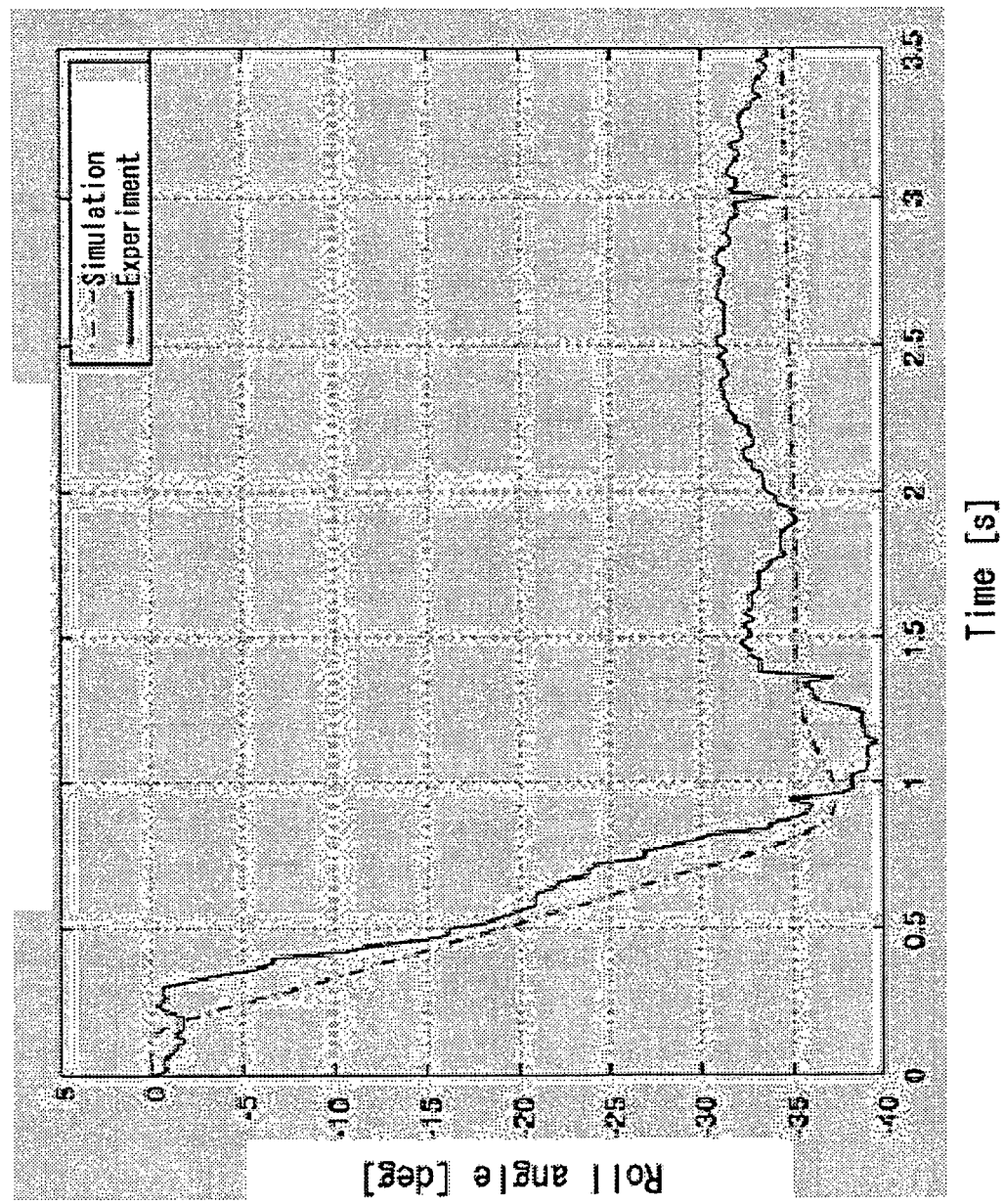
FIG. 6 is a simulated and experimental results of roll axis of the invention.
Figure 7:
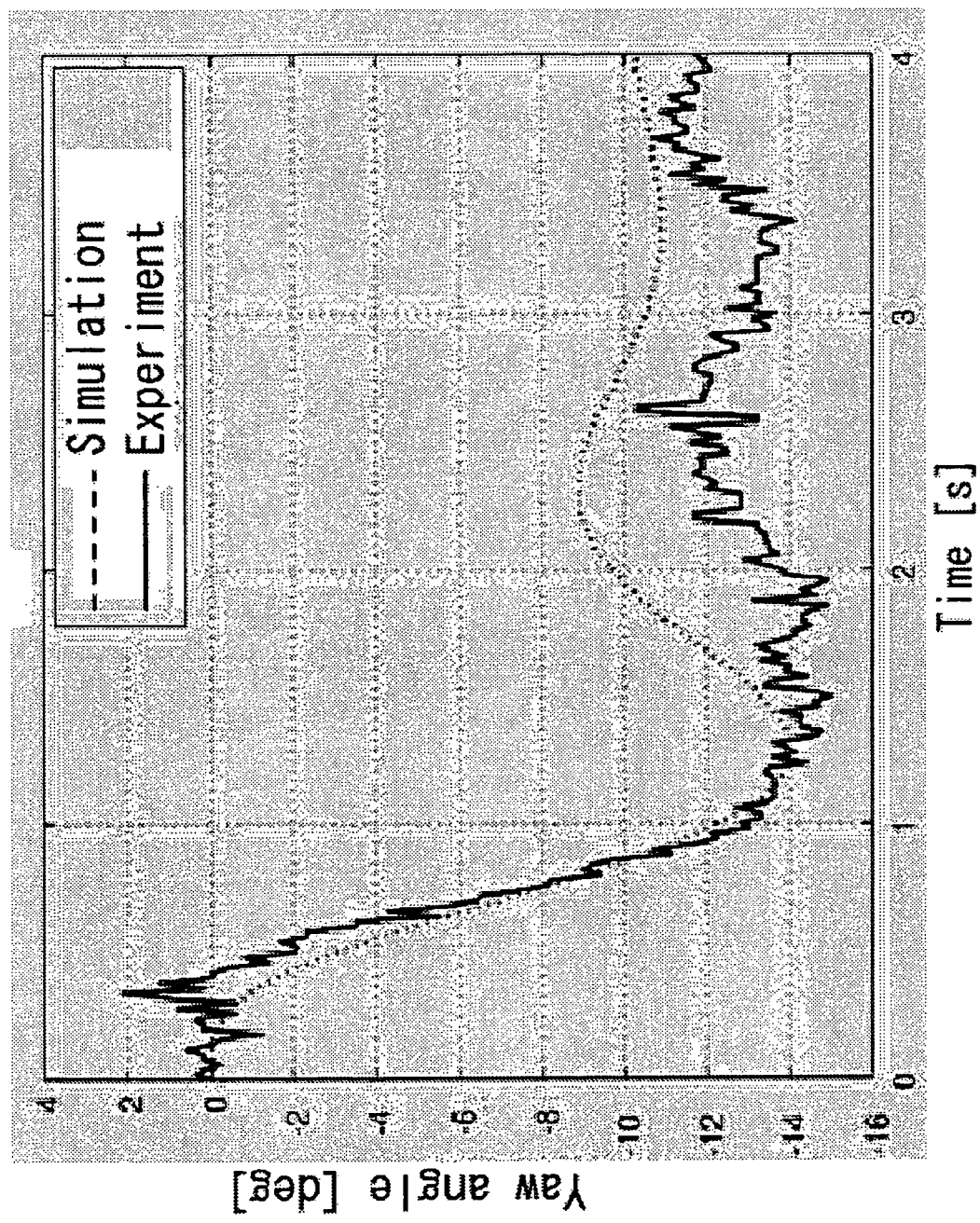
FIG. 7 is a simulated and experimental results of yaw axis of the invention.

Therefore, the yaw axis rotational motion model takes the form of a system that includes delay time, a second-order delay system, and one integrator, as shown in Eq. (4):

$$G_\psi(s) = e^{-Ls} \frac{K_\psi \omega_{ns}^2}{(s^2 + 2\xi_s \omega_{ns} s + \omega_{ns}^2)s} \quad (4)$$

wherein
$G_\psi$: parameter
$e^{-Ls}$: delay time element
$K_\psi$: model gain
$\omega_{ns}$: characteristic angular frequency
s: laplace operator
$\xi_s$: damped ratio where the model gains ($K_\Theta$, $K_\phi$, $K_\psi$) and the time constants ($T_\Theta$, $T_\phi$) are adjusted and determined by comparing experimental and simulation data so that the two sets of numerical data will agree. FIGS. 5 through 7 shows the simulated and experimental results of above-mentioned three models.

Figure 8:
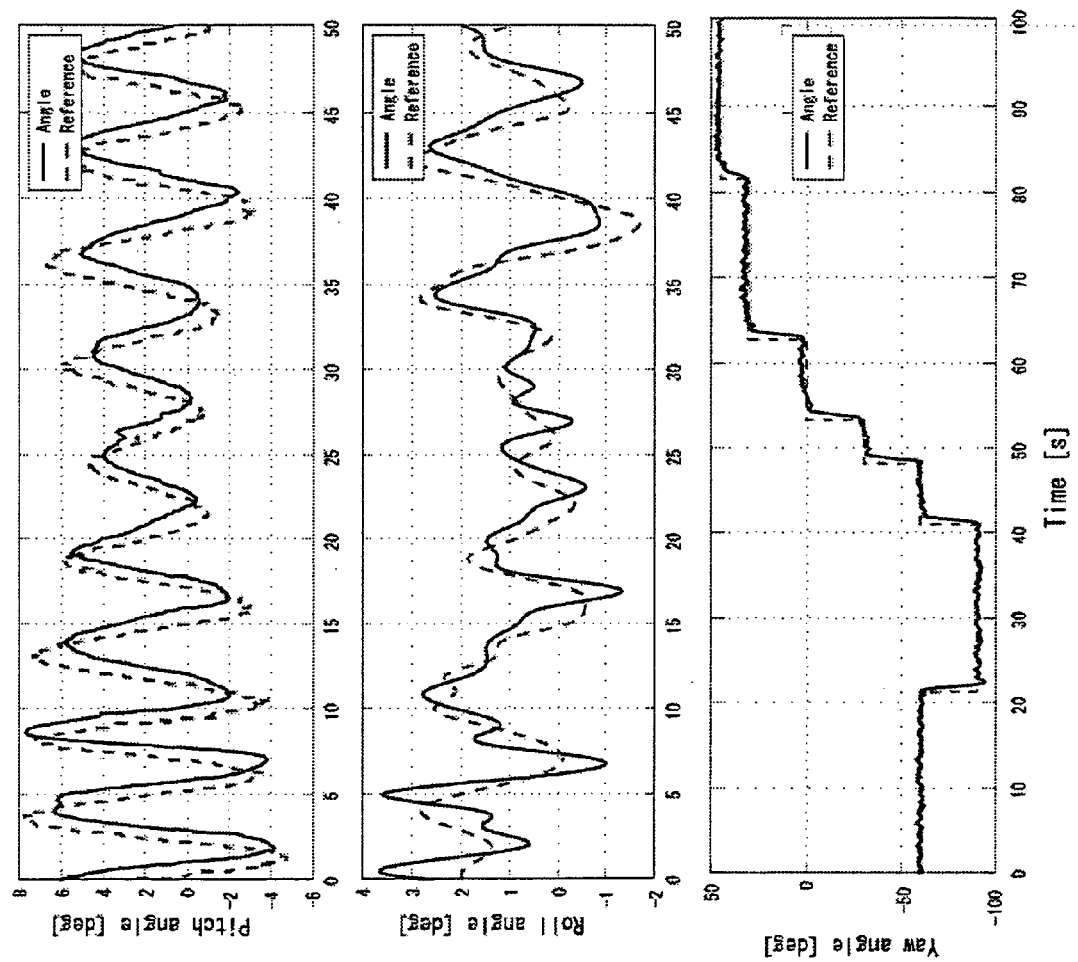
FIG. 8 is an experimental results of pitch angle, roll angle and yaw angle with control of the invention.

In the present mode of embodiment, the LQG optimal control theory is applied to the above three mathematical models to design an autonomous control algorithm. In addition, a first-order servo system was constructed to eliminate steady-state deviations. An optimal feedback gain is determined by assuming that the pitching angle θ, the rolling angle φ, and the yawing angle ψ are either single-input, single-output (SISO) systems or uncoupled systems, respectively. FIG. 8 shows experimental results that were produced by the controller thus obtained.

(Translational Motion Control)

In this section, we explain translational motion controls using the control system for a small unmanned helicopter.

(Longitudinal/Lateral Motion Model)

Figure 9:
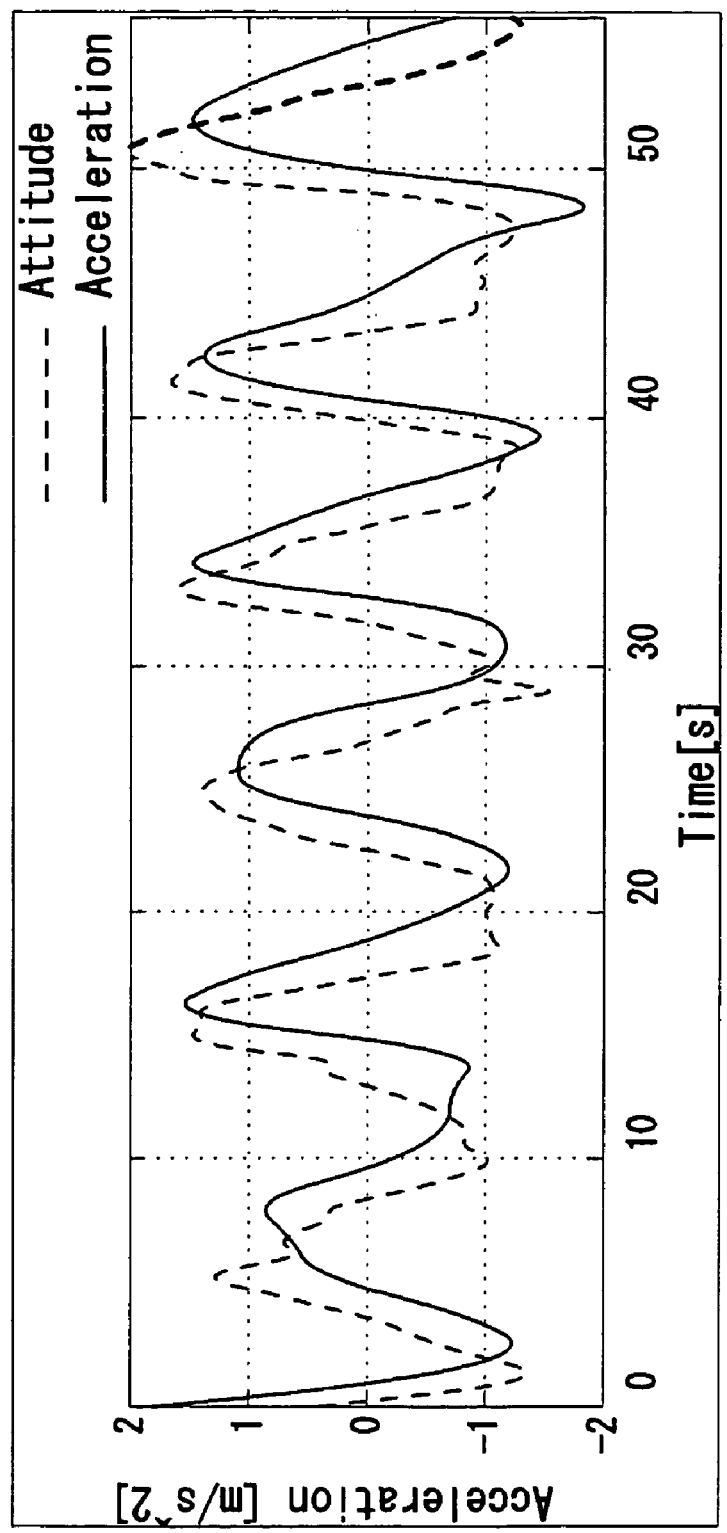
FIG. 9 is a relation between attitude angle and body acceleration.

From a simple dynamical analysis, the following equation on the lateral speed Y of the body can be obtained:

$$Vy = g\frac{1}{s}\Phi \tag{5}$$

wherein
Vy: lateral speed
g: gravity acceleration
s: laplace operator
Φ: rolling axis attitude angle where g denotes the acceleration due to gravity; and Φ, the rolling attitude angle. The derivation of Eq. (5) is based on the assumption that the helicopter body is at a fixed altitude and that Φ<<1. The experimental data shown in FIG. 9 suggests the existence of some motion properties between the attitude angle of the body and the acceleration. By approximating these properties in terms of a first-order delay and by comparing experimental results with simulations, we added one instability pole to Eq. (5), and used the following transfer function representation mathematical model in the final design of the control system:

$$Vy = g\frac{T}{s+T}\frac{a}{s-a}\Phi \tag{6}$$

wherein
Vy: lateral speed
g: gravity acceleration
T: thrust
s: laplace operator
a: two dimensional dynamic lift inclination
Φ: rolling axis attitude angle A similar mathematical model was also used for the longitudinal speed of the helicopter body:

$$Vx = g\frac{T}{s+T}\frac{a}{s-a}(-\Theta) \tag{7}$$

wherein

Figure 10:
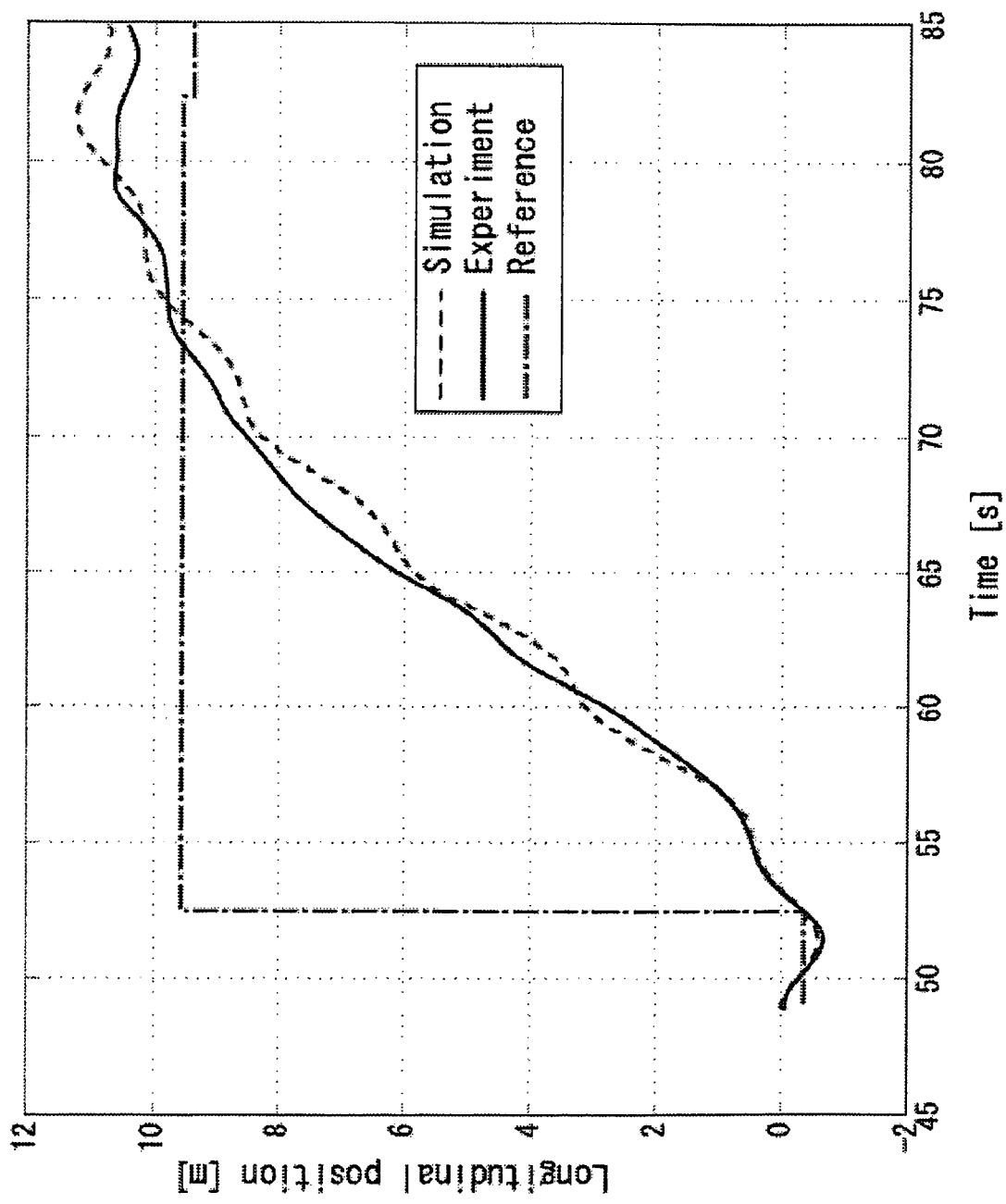
FIG. 10 is a simulated and experimental results.

Vx: longitudinal speed
g: gravity acceleration
T: thrust
s: laplace operator
a: two dimensional dynamic lift inclination
Θ: pitching axis attitude angle where Θ denotes the pitching attitude angle of the body. FIG. 10 shows the simulated and experimental results of above-mentioned model.

(Vertical Motion Model)

The helicopter performs vertical motions by varying the blade corrective pitch, thus varying the rotor lift. According to blade wing element theory, the lift due to a rotor can be represented as follows:

$$T = \frac{b}{4}\rho a \Omega^2 R^3 (\theta_t + \phi_t)c \tag{8}$$

wherein
T: lift
b: number of rotor blades
ρ: density of air
a: slope of two-dimensional lift
Ω: rotor rpm
R: radius of rotor blade
$\theta_t$: corrective pitch angle
$\phi_t$: inflow angle
c: chord length where b denotes the number of rotor blades; ρ, the density of air, a, the slope of the two-dimensional lift; Ω, the rotor rpm; R, the radius of the rotor blade; $\theta_t$, the corrective pitch angle; $\phi_t$, the inflow angle; and c, chord length. Assuming that all of these variables with the exception of $\theta_t$ are constants, the following transfer function representation mathematical model for the velocity in the Z direction can be formulated:

$$V_z = \frac{k}{s}\Theta_t \tag{9}$$

wherein
Vz: vertical speed
k: constant
s: laplace operator
$\Theta_t$: corrective pitch angle (X-Y Direction Autonomous Control Algorithms)

Figure 11:
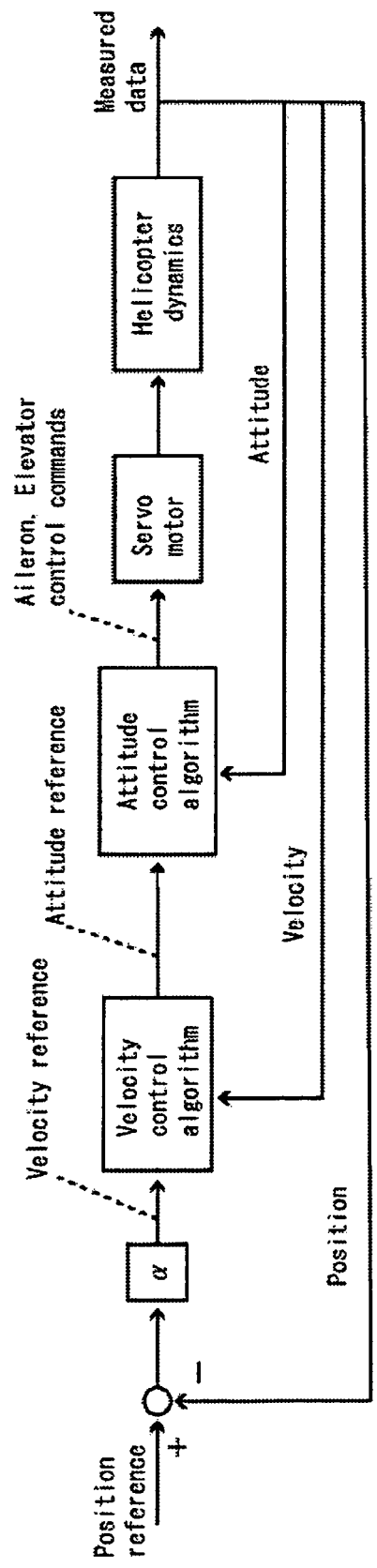
FIG. 11 is a configuration of position control loop in the X and the Y directions.

For the models represented by Eqs. (6) and (7), we designed independent velocity control algorithms for the X, Y, and Z directions based on LQI control theory. FIG. 11 shows an overall image of the X and Y position control loops. The velocity control algorithms for the X and Y directions are computational algorithms that calculate the attitude angle of the body to yield the required vehicle speeds when certain, respective, target speeds for the vehicle are given.

To move the body to an arbitrary target position, the respective target velocities are calculated according to the following equations:

$$V_{xref} = \alpha(P_{xref} - P_x) \tag{10}$$

$$V_{yref} = \alpha(P_{yref} - P_y) \tag{11}$$

where Vxref and Vyref denote target velocities in the X and Y directions, respectively; Pxref and Pyref denote target positions in the X and Y directions, respectively; Px and Py denote the X- and Y-coordinates of the body, respectively; and α is an arbitrary constant.

The control loop has a structure in which the attitude controller, the velocity controller, and the position controller are arranged serially. Compared with a single controller, this structure has the following advantages: (1) the ability to limit the attitude angle within a safe range; (2) an improved position control overshooting through the application of a velocity limiter; and (3) a controller internal state that is not dependent on positional coordinates.

The third advantage avoids the use of a complex algorithm for coordinate transformations when the yawing angle ψ is varied in an arbitrary coordinate system.

In view of the fact that the position and velocity for each axis can be observed by means of high-precision RTK-DGPS, one state quantity in the 3D model shown in Eqs. (6) and (7) is estimated by means of a minimum-dimension observer. Because the dynamics for the orientation servo systems are assumed to be sufficiently faster than the translational motion, their properties are not taken into considerations in the design of the control system.

(Z-Direction Autonomous Control Algorithm)

The velocity control algorithm for the Z direction was designed by comparing experimental results with simulation results, by adjusting and determining the value of k in Eq. (9) so that the two sets of numerical data agree, and by using the resulting value and applying LQI control theory. The velocity control algorithm with respect to the Z direction is a computational algorithm that calculates the corrective pitch necessary to implement the required speed of the vehicle when a target speed value in the Z direction is given.

To move the body to an arbitrary target position, the target velocity in the Z direction is calculated according to the following equation:

$$V_{zref} = \beta(P_{zref} - P_z) \qquad (12)$$

where Vzref denotes a target velocity the Z direction; Pzref, a target position value in the Z direction; Pz the Z-coordinate of the vehicle; and β, an arbitrary constant.

Figure 3:
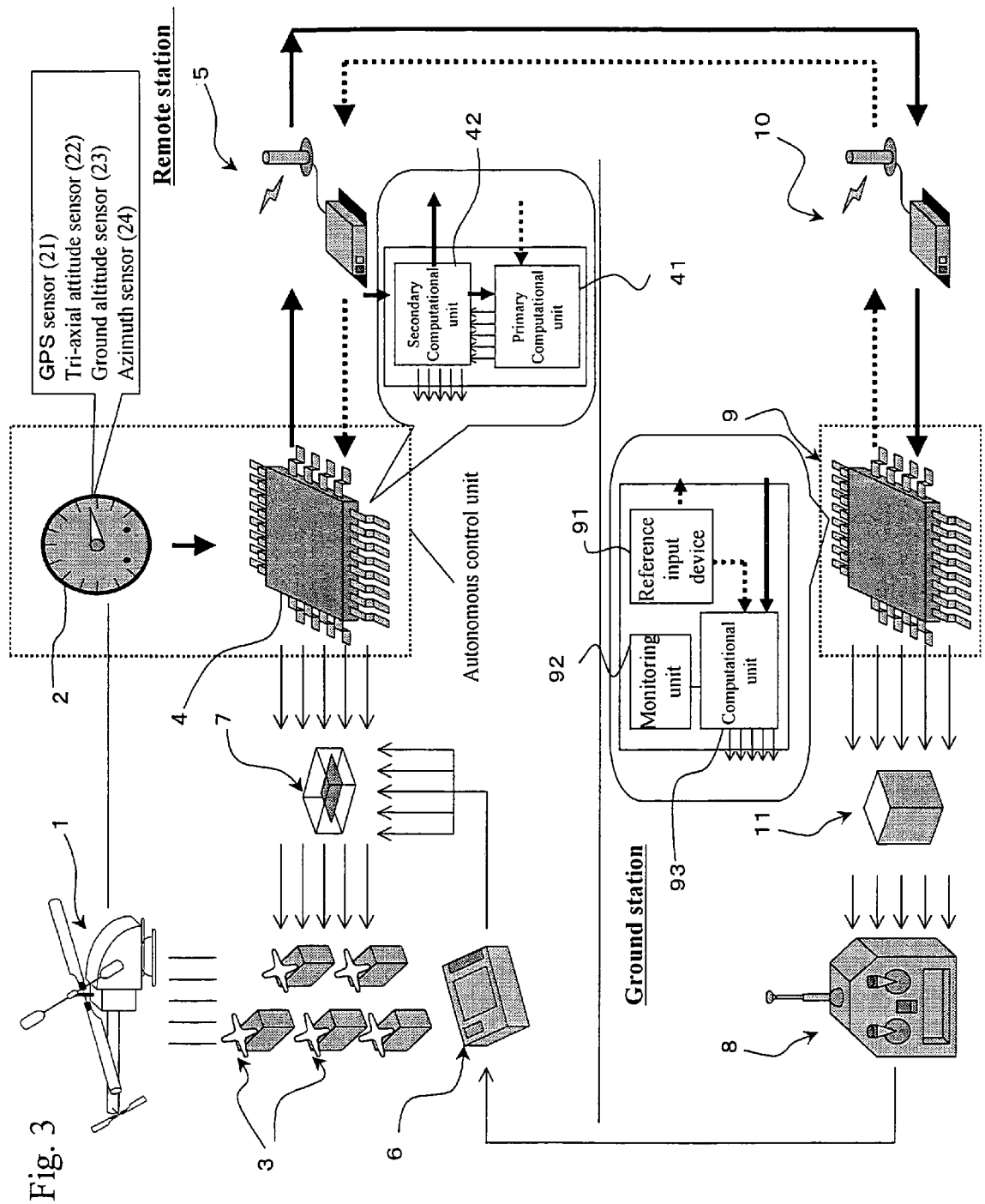
FIG. 3 is a configuration of autonomous control system using autonomous control device of small, unmanned helicopter of the invention.
Figure 12:
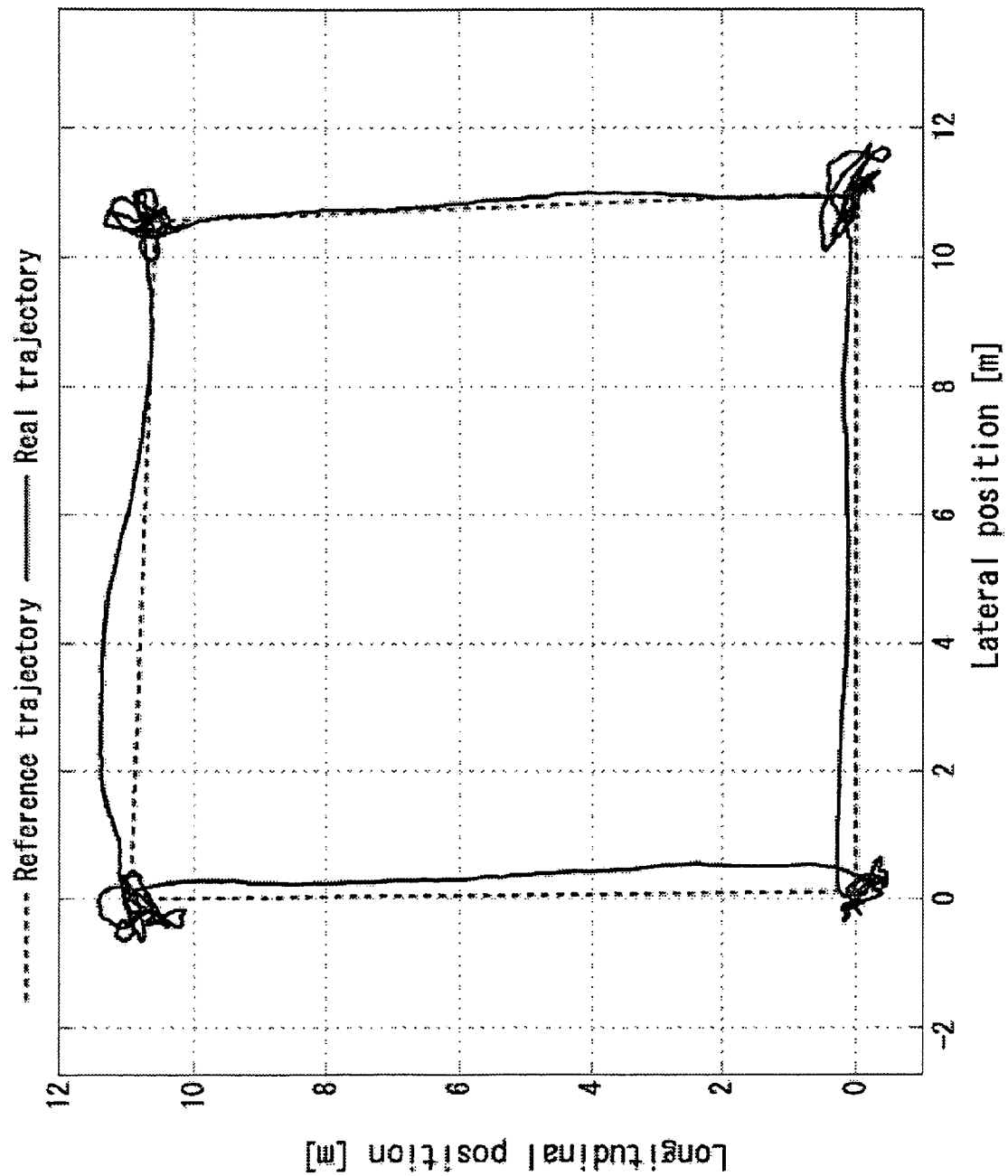
FIG. 12 is an experimental result of trajectory following control by control algorithm.
Figure 13:
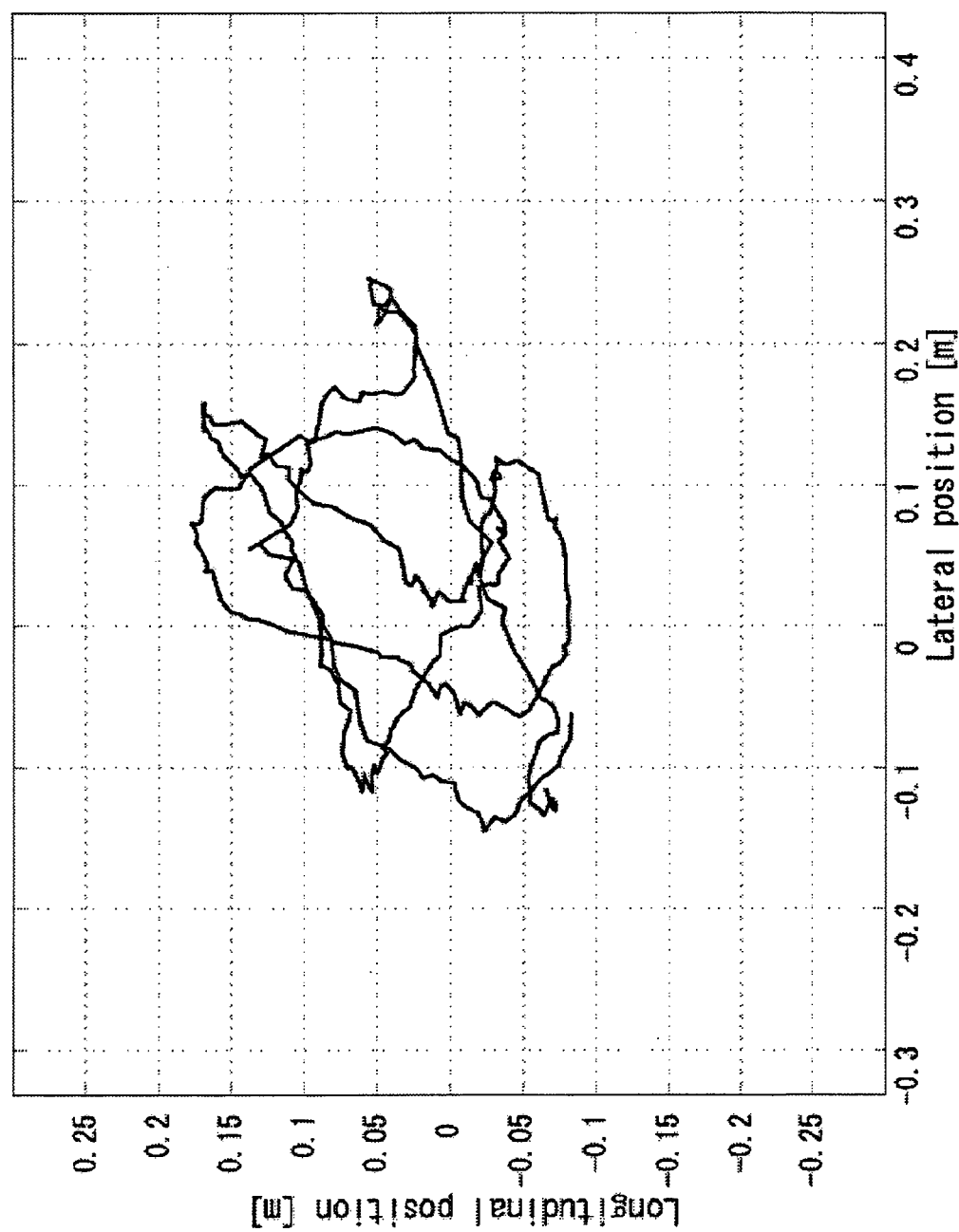
FIG. 13 is an experimental result of fixed hovering control.
Figure 14:
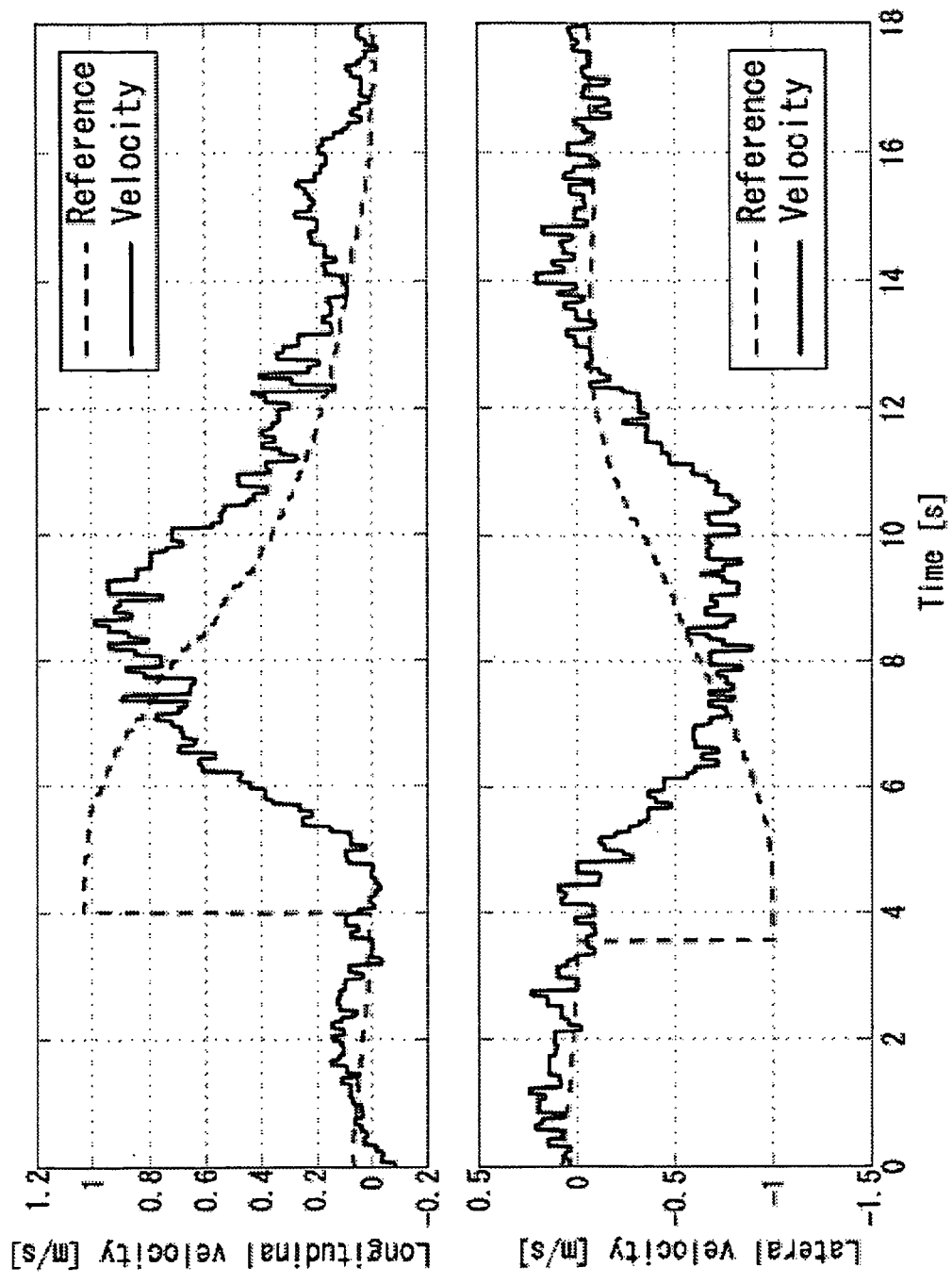
FIG. 14 is an experimental results of lateral and longitudinal velocity control.
Figure 15:
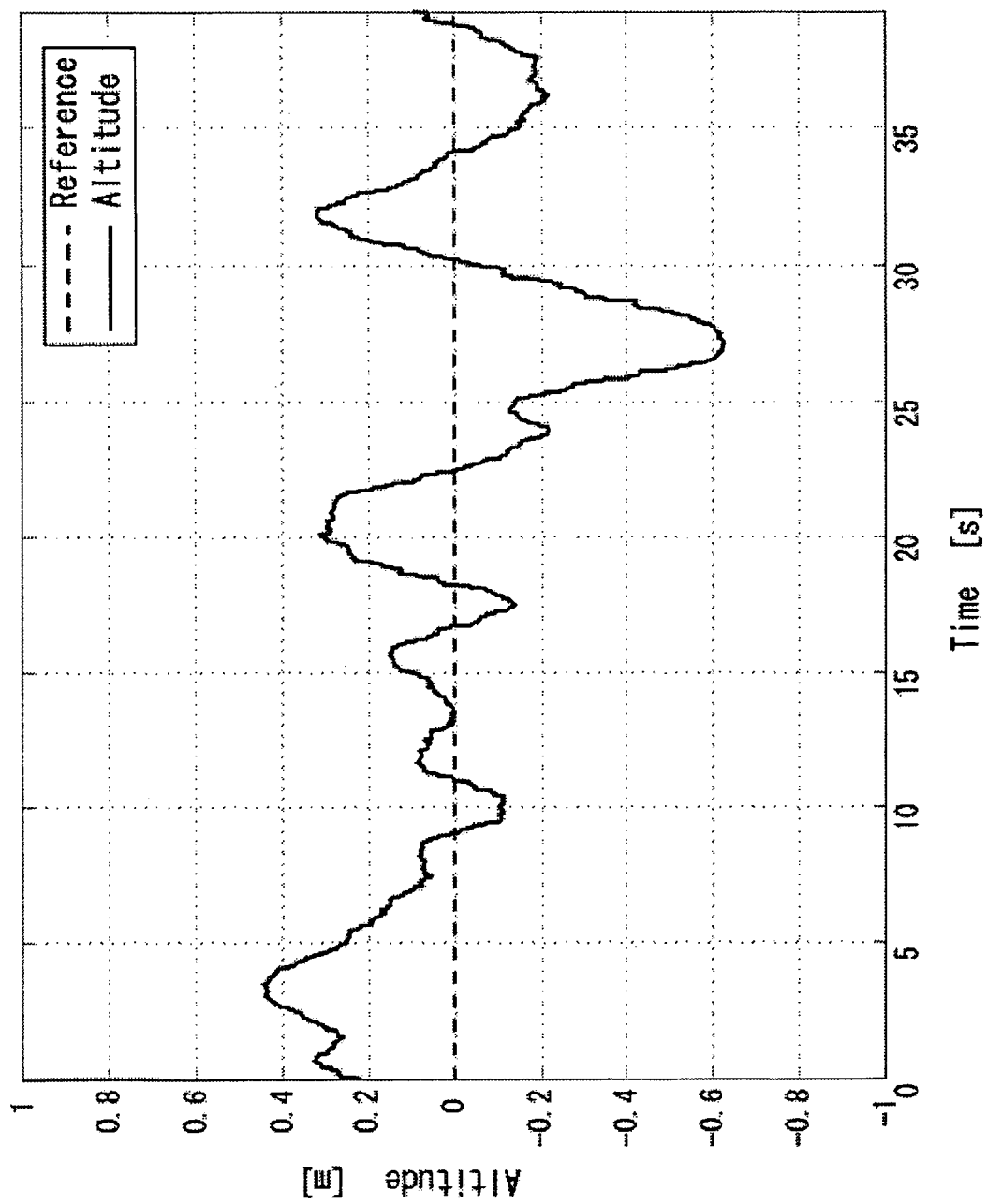
FIG. 15 is an experimental results of altitude control.

FIG. 12 shows the reference trajectory following control results, and FIG. 13 shows the experimental results of the hovering control. FIG. 14 shows the lateral and longitudinal velocity control results and FIG. 15 shows the altitude control results. Following is a description of a mode of embodiment of the autonomous control algorithm based on the aforementioned servo pulse mixing/switching unit, the aforementioned radio-controlled pulse generator unit, and the aforementioned mathematical models, such that the autonomous control algorithm is implemented on the aforementioned small unmanned helicopter. As shown in FIG. 3, The configuration of the system can be divided broadly into a mobile station, wherein the aforementioned autonomous control system and the aforementioned servo pulse mixing/switching unit are installed on the aforementioned small unmanned helicopter; and a ground station wherein the state of autonomous control is monitored and target values are input. Installed on the mobile station are a helicopter body 1; sensors 2 that detect the current position and the attitude angle of the helicopter body 1; servo motors 3 that operate the five rudders for the helicopter body 1; a CPU4 that independently calculates control reference values on optimal motion and direction for each of the servo motors 3 by using the aforementioned autonomous control algorithm, from the current flight state of the helicopter obtained from the sensor 2, and the target values that are set by the ground station; a wireless modem 5 that communicates with the ground station; a radio-controlled receiver 6 that receives manual operation signals from the radio-controlled transmitter 8; and a servo pulse mixing/switching unit 7. The aforementioned autonomous control system is built upon the sensor 2 and the CPU 4. In addition to its computation function, the CPU 4 is also endowed with the function of exchanging signals with the wireless modem 5 to permit monitoring of the sensor information obtained from the sensor 2 on the ground station and entering target values that are established by the ground station. Included in the sensor 2 are the GPS (not shown in the figure) that detects the position of the helicopter body 1; a tri-axial orientation sensor (not shown in the figure) that detects the orientation states of the three axes; a ground altimeter (not shown in the figure) that determines the altitude of the helicopter body; and a magnetic azimuth meter (not shown in the figure) that measures the azimuth. The servo pulse mixing/switching unit is a unit that can switch between manual operation signals and autonomous control signals, and can mix manual operation signals and autonomous control signals in any proportion. For example, if the autonomous control system for the helicopter fails during flight for some reason or the CPU 4 fails, disabling the autonomous control of the helicopter body, the aforementioned servo pulse mixing/switching unit will automatically switch to the manual operation mode, thus preventing the helicopter from crashing. In addition, the provision of the aforementioned servo pulse mixing/switching unit 7 permits the use of the autonomously controlled aforementioned small unmanned helicopter for training in the use of a radio-controlled helicopter. When the operator is not proficient in the operation of a radio-controlled helicopter, the ratio between autonomous control and manual control can be set so that it is heavily skewed in favor of autonomous control, such as 9:1 and 8:2, so that even if the operator maneuvers the helicopter unskillfully, the autonomous control signals transmitted by the CPU 4 will perform recovery operations to prevent crashing. As the operator gains familiarity with the operation of the radio-controlled helicopter, the ratio can be changed in favor of manual control, thereby improving the operator's skill in performing manual operations on the radio-controlled helicopter.

The ground station is provided with a CPU 91 for the input of position or velocity target values; a monitor CPU 92 that monitors sensor information on the helicopter body 1 that is transmitted from the mobile station; and a wireless modem 10 that performs communications with the mobile station. Also provided is a radio control transmitter 8 that permits the operator to perform manual operations.

Following is a description of the operation of the system. The operator enters position or velocity target values from the CPU 9 of the ground station. The target values, through the wireless modems 11 and 5, are entered into the CPU 4 that performs calculations. Based on the target values that are entered and the current flight status of the helicopter body 1 obtained from the sensors 2, the CPU 4 performs computations of the autonomous control algorithms that are designed based on aforementioned mathematical models (2), (3), (4), (6), (7), and (9). Based on the results of these computations, five types of control instructions involving optimal motion and direction for each of the servo motors 3 are determined. If full autonomous control is on, the servo pulse mixing/switching unit 7, not under the influence of manual operation signals, controls each of the servo motors 3 based on the controls signals having computed control reference values, thus achieving the fully autonomous control of the motions of the rudders for the helicopter body 1 according to target values. If manual operation signals are to be mixed by the servo pulse mixing/switching unit 7, control signals, mixed according to a set proportion, are transmitted to the servo motors 3.

As described above, according to the autonomous control system for the small unmanned helicopter based on this mode of embodiment, the implementation and installation of the autonomous control algorithms designed based on the above-described mathematical models (2), (3), (4), (6), (7), and (9), as well as the CPU 4, the sensors 2, and the servo motors 3, on a hobby helicopter body permit the calculation of control reference values that specify the optimal motion and direction for the respective, corresponding servo motors 3 from the current flight state obtained from the sensors 2 and from given position and velocity target values, by using the aforementioned autonomous control algorithms, thus achieving complete control of the helicopter body according to target values.

It should be noted that, as another mode of embodiment, the autonomous control of the aforementioned small unmanned helicopter can be similarly achieved by installing a computer similar in computational capabilities to the CPU 4, on the ground station. However, in this case, the feedback control loop that is formed would contain two wireless sections in the wireless modem and in the manual operation transmitter/receiver. In such a case, if wireless communications break down, the logical structure of the control system will collapse, thus posing a risk of instability of the flight of the aforementioned small unmanned helicopter. From a flight safety standpoint, it is not desirable to implement all of the aforementioned autonomous control algorithms on a host computer installed on the ground station. In such a case, the CPU 4 and the aforementioned ground station host computer can be used in combination for control computation purposes by combining the aforementioned servo pulse mixing/switching unit and the aforementioned radio control pulse generator unit.

Many widely different embodiments of the present invention may be constructed without departing from the spirit and scope of the present invention. It should be understood that the present invention is not limited to the specific embodiments described in the specification, except as defined in the appended claims.

The invention claimed is:

1. An autonomous control method for a small unmanned helicopter comprising steps of:
   detecting a current position, an attitude angle including pitch, roll and yaw axes attitude angles, an altitude relative to the ground, and an absolute azimuth of the nose of the small unmanned helicopter;
   establishing at least one of position and velocity reference values from a ground station;
   determining optimal control reference values for driving servo motors that move a plurality of helicopter rudders from the current position and the attitude angle of said small unmanned helicopter detected by sensors;
   effecting translational motion control and tri-axial orientation control on the small unmanned helicopter based upon computational processing results; and
   defining the mathematical model for a transfer function representation including pitching operation input and pitch axis attitude angles in the tri-axial orientation control for said small unmanned helicopter as $$G_\theta(s) = e^{-Ls} \frac{K_\theta \omega_{ns}^2}{(s^2 + 2\varsigma_s \omega_{ns} s + \omega_{ns}^2)(T_\theta s + 1)s} \quad (13)$$

wherein
$G_\theta$: parameter
$e^{-Ls}$: delay time element
$K_\theta$: model gain
$T_\theta$: model gain
$\omega_{ns}$: characteristic angular frequency
s: laplace operator
$\xi_s$: damped ratio and,
causing a primary computational unit to calculate optimal control reference values for driving the servo motors based upon said model equations.

2. An autonomous control method for a small unmanned helicopter comprising steps of:
   detecting a current position, an attitude angle including pitch, roll and yaw axes attitude angles, an altitude relative to the ground, and an absolute azimuth of the nose of the small unmanned helicopter;
   establishing at least one of position and velocity reference values from a ground station;
   determining optimal control reference values for driving servo motors that move a plurality of helicopter rudders from the current position and the attitude angle of said small unmanned helicopter detected by sensors;
   effecting translational motion control and tri-axial orientation control on the small unmanned helicopter based upon computational processing results; and
   defining the mathematical model for a transfer function representation including rolling input and roll axis attitude angles in the tri-axial orientation control for said small unmanned helicopter as $$G_\phi(s) = e^{-Ls} \frac{K_\phi \omega_{ns}^2}{(s^2 + 2\varsigma_s \omega_{ns} s + \omega_{ns}^2)(T_\phi s + 1)s} \quad (14)$$

wherein
$G_\phi$: parameter
$e^{-Ls}$: delay time element
$K_\phi$: model gain
$T_\phi$: model gain
$\omega_{ns}$: characteristic angular frequency
s: laplace operator
$\xi_s$: damped ratio and,
causing a primary computational unit to calculate optimal control reference values for driving the servo motors based upon said model equations.

3. An autonomous control method for a small unmanned helicopter comprising steps of:
   detecting a current position, an attitude angle including pitch, roll and yaw axes attitude angles, an altitude relative to the ground, and an absolute azimuth of the nose of the small unmanned helicopter;
   establishing at least one of position and velocity reference values from a ground station;
   determining optimal control reference values for driving servo motors that move a plurality of helicopter rudders from the current position and the attitude angle of said small unmanned helicopter detected by sensors;

effecting translational motion control and tri-axial orientation control on the small unmanned helicopter based upon computational processing results; and defining the mathematical model for a transfer function representation including yawing input and yawing axis attitude angles in the tri-axial orientation control for said small unmanned helicopter as $$G_\psi(s) = e^{-Ls} \frac{K_\psi \omega_{ns}^2}{(s^2 + 2\zeta_s \omega_{ns} s + \omega_{ns}^2)s} \qquad (15)$$

wherein
$G_\psi$: parameter
$e^{-Ls}$: delay time element
$K_\psi$: model gain
$\omega_{ns}$: characteristic angular frequency
s: laplace operator
$\zeta_s$: damped ratio and,
causing a primary computational unit to calculate optimal control reference values for driving the servo motors based upon said model equations.

4. An autonomous control method for a small unmanned helicopter comprising steps of:
detecting a current position, an attitude angle including pitch, roll and yaw axes attitude angles, an altitude relative to the ground, and an absolute azimuth of the nose of the small unmanned helicopter;
establishing at least one of position and velocity reference values from a ground station;
determining optimal control reference values for driving servo motors that move a plurality of helicopter rudders from the current position and the attitude angle of said small unmanned helicopter detected by sensors;
effecting translational motion control and tri-axial orientation control on the small unmanned helicopter based upon computational processing results; and
defining the mathematical model for a transfer function representation including pitching axis attitude angles and longitudinal speed in the tri-axial orientation control for said small unmanned helicopter as $$Vx = g \frac{T}{s+T} \frac{a}{s-a}(-\Theta) \qquad (16)$$

wherein
Vx: longitudinal speed
g: gravity acceleration
T: thrust
s: laplace operator
a: two dimensional dynamic lift inclination
$\Theta$: pitching axis attitude angle and,
causing a primary computational unit to calculate optimal control reference values for driving the servo motors based upon said model equations.

5. An autonomous control method for a small unmanned helicopter comprising steps of:
detecting a current position, an attitude angle including pitch, roll and yaw axes attitude angles, an altitude relative to the ground, and an absolute azimuth of the nose of the small unmanned helicopter;
establishing at least one of position and velocity reference values from a ground station;

determining optimal control reference values for driving servo motors that move a plurality of helicopter rudders from the current position and the attitude angle of said small unmanned helicopter detected by sensors;
effecting translational motion control and tri-axial orientation control on the small unmanned helicopter based upon computational processing results; and
defining the mathematical model for a transfer function representation including rolling axis attitude angles and lateral speed in a translational motion control for said small unmanned helicopter as $$Vy = g \frac{T}{s+T} \frac{a}{s-a} \Phi \qquad (17)$$

wherein
Vy: lateral speed
g: gravity acceleration
T: thrust
s: laplace operator
a: two dimensional dynamic lift inclination
$\Phi$: rolling axis attitude angle and,
causing a primary computational unit to calculate optimal control reference values for driving the servo motors based upon said model equations.

6. An autonomous control method for a small unmanned helicopter comprising steps of:
detecting a current position, an attitude angle including pitch, roll and yaw axes attitude angles, an altitude relative to the ground, and an absolute azimuth of the nose of the small unmanned helicopter;
establishing at least one of position and velocity reference values from a ground station;
determining optimal control reference values for driving servo motors that move a plurality of helicopter rudders from the current position and the attitude angle of said small unmanned helicopter detected by sensors;
effecting translational motion control and tri-axial orientation control on the small unmanned helicopter based upon computational processing results; and
defining the mathematical model for a transfer function representation including corrective pitching operation input and vertical speed in a translational motion control for said small unmanned helicopter as $$Vz = \frac{k}{s}\Theta_t \qquad (18)$$

wherein
Vz: vertical speed
k: constant
s: laplace operator
$\Theta_t$: corrective pitch angle and,
causing a primary computational unit to calculate optimal control reference values for driving the servo motors based upon said model equations.

7. An autonomous control method for a small unmanned helicopter comprising steps of:
detecting a current position, an attitude angle including pitch, roll and yaw axes attitude angles, an altitude relative to the ground, and an absolute azimuth of the nose of the small unmanned helicopter;
establishing at least one of position and velocity reference values from a ground station;

determining optimal control reference values for driving servo motors that move a plurality of helicopter rudders from the current position and the attitude angle of said small unmanned helicopter detected by sensors;

effecting translational motion control and tri-axial orientation control on the small unmanned helicopter based upon computational processing results;

defining the mathematical model for a transfer function representation including pitching operation input and pitch axis attitude angles in the tri-axial orientation control for said small unmanned helicopter as $$G_\theta(s) = e^{-Ls} \frac{K_\theta \omega_{ns}^2}{(s^2 + 2\varsigma_s \omega_{ns} s + \omega_{ns}^2)(T_\theta s + 1)s} \quad (19)$$

wherein
$G_\theta$: parameter
$e^{-Ls}$: delay time element
$K_\theta$: model gain
$T_\theta$: model gain
$\omega_{ns}$: characteristic angular frequency
s: laplace operator
$\xi_s$: damped ratio defining the mathematical model for a transfer function representation including rolling input and roll axis attitude angles in the tri-axial orientation control for said small unmanned helicopter as $$G_\phi(s) = e^{-Ls} \frac{K_\phi \omega_{ns}^2}{(s^2 + 2\varsigma_s \omega_{ns} s + \omega_{ns}^2)(T_\phi s + 1)s} \quad (20)$$

wherein
$G_\phi$: parameter
$e^{-Ls}$: delay time element
$K_\phi$: model gain
$T_\phi$: model gain
$\omega_{ns}$: characteristic angular frequency
s: laplace operator
$\xi_s$: damped ratio defining the mathematical model for a transfer function representation including yawing input and yawing axis attitude angles in the tri-axial orientation control for said small unmanned helicopter as $$G_\psi(s) = e^{-Ls} \frac{K_\psi \omega_{ns}^2}{(s^2 + 2\varsigma_s \omega_{ns} s + \omega_{ns}^2)s} \quad (21)$$

wherein
$G_\psi$: parameter
$e^{-Ls}$: delay time element
$K_\psi$: model gain
$\omega_{ns}$: characteristic angular frequency
s: laplace operator
$\xi_s$: damped ratio defining the mathematical model for a transfer function representation including pitching axis attitude angles and longitudinal speed in the tri-axial orientation control for said small unmanned helicopter as $$Vx = g \frac{T}{s+T} \frac{a}{s-a}(-\Theta) \quad (22)$$

wherein
Vx: longitudinal speed
g: gravity acceleration
T: thrust
s: laplace operator
a: two dimensional dynamic lift inclination
$\Theta$: pitching axis attitude angle defining the mathematical model for a transfer function representation including rolling axis attitude angles and lateral speed in a translational motion control for said small unmanned helicopter as $$Vy = g \frac{T}{s+T} \frac{a}{s-a} \Phi \quad (23)$$

wherein
Vy: lateral speed
g: gravity acceleration
T: thrust
s: laplace operator
a: two dimensional dynamic lift inclination
$\Phi$: rolling axis attitude angle and, defining the mathematical model for a transfer function representation including corrective pitching operation input and vertical speed in a translational motion control for said small unmanned helicopter as $$Vz = \frac{k}{s} \Theta_t \quad (24)$$

wherein
Vz: vertical speed
k: constant
s: laplace operator
$\Theta_t$: corrective pitch angle and, causing a primary computational unit to calculate optimal control reference values for driving the servo motors based upon said model equations.

8. The autonomous control method for a small unmanned helicopter of claim 7, wherein, in determining optimal control reference values for driving the servo motors that drive the rudders for the small unmanned helicopter, said primary computational unit for said autonomous control system autonomously controls said small unmanned helicopter by executing independent autonomous control algorithms on the six physical quantities of said small unmanned helicopter: pitch axis attitude angle, roll axis attitude angle, yaw axis attitude angle, longitudinal speed, lateral speed, and vertical speed.

9. The autonomous control method for a small unmanned helicopter of claim 8, wherein said small unmanned helicopter is autonomously controlled by constructing the respective autonomous control algorithms as a type 1 servo system so that for the respective physical quantities of said small unmanned helicopter, the steady-state deviation from any reference value will be zero.

10. The autonomous control method for a small unmanned helicopter of claim 9, wherein said small unmanned helicopter is autonomously controlled by applying either the linear quadratic Gaussian (LQG) theory or the linear quadratic integral (LQI) theory to the autonomous control algorithms that are constituted as a type 1 servo system, by treating the respective autonomous control algorithms as uncoupled transfer function representation mathematical models.

11. The autonomous control method for a small unmanned helicopter of claim 7, wherein, in determining optimal control reference values for driving the servo motors that drive the rudders for the small unmanned helicopter, dynamic characteristics consisting of longitudinal speeds and lateral speeds are represented as mathematical models for which pitch axis attitude angles and roll axis attitude angles are input quantities, and said small unmanned helicopter is controlled autonomously by calculating the respective attitude angles that are necessary for effecting arbitrary longitudinal and lateral speeds.

12. The autonomous control method for a small unmanned helicopter of claim 7, wherein, in determining optimal control reference values for driving the servo motors that drive the rudders for the small unmanned helicopter, in order to move said small unmanned helicopter to an arbitrary position, longitudinal, lateral, and vertical speed reference values are defined as follows:

$$Vxref = \alpha(Pxref - Px) \tag{25}$$

for a longitudinal reference value, $$Vyref = \alpha(Pyref - Py) \tag{26}$$

for a lateral value, and $$Vzref = \beta(Pzref - Pz) \tag{27}$$

for a vertical reference value,
wherein
Vxref: target velocity in X direction
$\alpha$: arbitrary constant
Pxref: target position in X direction
Px: X-coordinate of body
Vyref: target velocity in Y direction
Pyref target position in Y direction
Py: Y-coordinate of body
Vzref: target velocity in Z direction
$\beta$: arbitrary constant
Pzref: target position in Z direction
Pz: Z-coordinate of body
thereby effecting the autonomous control of said small unmanned helicopter.

13. The small unmanned helicopter autonomous control method of claim 1, wherein, in determining optimal control reference values for driving the servo motors that drive the rudders for the small unmanned helicopter, and further, the transfer function representation mathematical model including the rolling force and rolling axis attitude angles in the tri-axial orientation control for said small unmanned helicopter is defined as $$G_\phi(s) = e^{-Ls} \frac{K_\phi \omega_{ns}^2}{(s^2 + 2\varsigma_s \omega_{ns} s + \omega_{ns}^2)(T_\phi s + 1)s} \tag{28}$$

wherein
$G_\phi$: parameter
$e^{-Ls}$: delay time element
$K_\phi$: model gain
$T_\phi$: model gain
$\omega_{ns}$: characteristic angular frequency
s: laplace operator
$\xi_s$: damped ratio and,
said small unmanned helicopter is autonomously controlled based on said mathematical model.

14. The small unmanned helicopter autonomous control algorithm of claim 13, wherein, in determining optimal control reference values for driving the servo motors that drive the rudders for the small unmanned helicopter, and further, the transfer function representation mathematical model including the yawing force and yawing axis attitude angles in the tri-axial orientation control for said small unmanned helicopter is defined as $$G_\psi(s) = e^{-Ls} \frac{K_\psi \omega_{ns}^2}{(s^2 + 2\varsigma_s \omega_{ns} s + \omega_{ns}^2)s} \tag{29}$$

wherein
$G_\psi$: parameter
$e^{-Ls}$: delay time element
$K_\psi$: model gain
$\omega_{ns}$: characteristic angular frequency
s: laplace operator
$\xi_s$: damped ratio and,
said small unmanned helicopter is autonomously controlled based on said mathematical model.

15. The small unmanned helicopter autonomous control method of claims 14, wherein, in determining optimal control reference values for driving the servo motors that drive the rudders for the small unmanned helicopter, and further, the transfer function representation mathematical model including the pitching axis attitude angle and the longitudinal speed in the tri-axial orientation control for said small unmanned helicopter is defined as $$Vx = g \frac{T}{s+T} \frac{a}{s-a}(-\Theta) \tag{30}$$

wherein
Vx: longitudinal speed
g: gravity acceleration
T: thrust
s: laplace operator
a: two dimensional dynamic lift inclination
$\Theta$: pitching axis attitude angle and,
said small unmanned helicopter is autonomously controlled based on said mathematical model.

16. The small unmanned helicopter autonomous control method of claim 15, wherein, in determining optimal control reference values for driving the servo motors that drive the rudders for the small unmanned helicopter, and further, the transfer function representation mathematical model including the rolling axis attitude angle and the lateral speed in the translational motion control for said small unmanned helicopter is defined as $$Vy = g \frac{T}{s+T} \frac{a}{s-a} \Phi \tag{31}$$

wherein
Vy: lateral speed
g: gravity acceleration
T: thrust
s: laplace operator a: two dimensional dynamic lift inclination Φ: rolling axis attitude angle and, said small unmanned helicopter is autonomously controlled based on said mathematical model.

17. The small unmanned helicopter autonomous control method of claim 16, wherein, in determining optimal control reference values for driving the servo motors that drive the rudders for the small unmanned helicopter, and further, the transfer function representation mathematical model for the vertical speed in the translational motion control for said small unmanned helicopter is defined as $$V_Z = \frac{k}{s}\Theta_t \quad (32)$$

wherein

Vz: vertical speed k: constant s: laplace operator $\Theta_t$: corrective pitch angle and, said small unmanned helicopter is autonomously controlled based on said mathematical model.

18. The autonomous control method for a small unmanned helicopter of claim 13, wherein, in determining optimal control reference values for driving the servo motors that drive the rudders for the small unmanned helicopter, the transfer function representation mathematical model that describes the dynamic characteristics of said servo motors included in said Eqs. 13 and 28 is defined as $$G_s(s) = \frac{\omega_{ns}^2}{(s^2 + 2\varsigma_s\omega_{ns}s + \omega_{ns}^2)} \quad (33)$$

wherein $G_s$: parameter $\omega_{ns}$: characteristic angular frequency s: laplace operator $\xi_s$: damped ratio and, wherein an autonomous control algorithm is designed by entering M-series signals (pseudo-white signals) into said servo motors, by applying a partial space identification method based on input/output relationships, by determining the unknown parameters (ns and (sin Eq. 33, and by using the resulting values, thereby autonomously controlling said small unmanned helicopter.

19. The autonomous control method for a small unmanned helicopter of claim 7, wherein, in determining optimal control reference values for driving the servo motors that drive the rudders for the small unmanned helicopter, the parameters that are included in said Eqs. 19 through 24, specifically, parameters K(, and T(, contained in Eq. 19; parameters K(, and T(, contained in Eq. 20; parameters K(, contained in Eq. 21; parameters T and a contained in Eq. 22 and Eq. 23; and parameter k contained in Eq. 24 are adjusted so that their experimental results and simulation results will agree, autonomous control algorithms are designed according to the resulting values, and said small unmanned helicopter is thereby autonomously controlled.

20. The autonomous control method for a small unmanned helicopter of claim 7, wherein, in determining optimal control reference values for driving the servo motors that drive the rudders for the small unmanned helicopter, sine wave signals representing arbitrary frequency, amplitude, and time values are entered into said servo motors by manual operation, and during this process, said sine wave signals are obtained by using a function that outputs manual operation signals that are input into said servo pulse mixing/switching unit of a servo pulse mixing/switching unit that is an external device to said autonomous control system; wherein, simultaneously, the flight status of said small unmanned helicopter is obtained by means of said sensors for said autonomous control system, and wherein the parameters contained in Eqs. 19 through 24 are determined by analyzing the interrelationship between the various pieces of data thus obtained, and wherein autonomous control algorithms are created based on the mathematical models thus obtained.

* * * * *